(12) United States Patent
Teichert

(10) Patent No.: US 8,490,749 B2
(45) Date of Patent: Jul. 23, 2013

(54) DEVICE FOR ENABLING ACCESS TO A STRUCTURE ABOVE GROUND LEVEL

(75) Inventor: Paul Teichert, Sydals (DK)

(73) Assignee: PP Energy APS, Nordborg (DK)

( * ) Notice: Subject to any disclaimer, the term of this patent is extended or adjusted under 35 U.S.C. 154(b) by 994 days.

(21) Appl. No.: 12/162,391

(22) PCT Filed: Jan. 29, 2007

(86) PCT No.: PCT/DK2007/000042
§ 371 (c)(1),
(2), (4) Date: Nov. 26, 2008

(87) PCT Pub. No.: WO2007/085265
PCT Pub. Date: Aug. 2, 2007

(65) Prior Publication Data
US 2009/0173573 A1   Jul. 9, 2009

(30) Foreign Application Priority Data

Jan. 27, 2006 (DK) .......................... PA 2006 00131
Mar. 17, 2006 (DK) .......................... PA 2006 00384
Jul. 11, 2006 (DK) .......................... PA 2006 00958

(51) Int. Cl.
*E04G 3/30* (2006.01)

(52) U.S. Cl.
USPC ........... 182/187; 182/128; 182/141; 182/142; 182/150; 182/188

(58) Field of Classification Search
USPC .................. 182/19, 128, 130, 131, 141, 142, 182/150, 187, 188
See application file for complete search history.

(56) References Cited

U.S. PATENT DOCUMENTS

| | | | | |
|---|---|---|---|---|
| 3,220,509 A | * | 11/1965 | Fisher | 182/142 |
| 3,347,339 A | * | 10/1967 | Coole | 182/14 |
| 3,681,565 A | * | 8/1972 | Fisher | 219/126 |
| 4,552,248 A | * | 11/1985 | Payne | 182/142 |

(Continued)

FOREIGN PATENT DOCUMENTS

| | | |
|---|---|---|
| DE | 43 39 638 | 5/1995 |
| DE | 296 03 278 | 6/1996 |
| DE | 199 09 698 | 4/2000 |
| DE | 103 18 675 | 11/2004 |

(Continued)

OTHER PUBLICATIONS

International Search Report; PCT/DK2007/000042; Apr. 23, 2007.

*Primary Examiner* — Alvin Chin Shue
*Assistant Examiner* — Colleen M Chavchavadze
(74) *Attorney, Agent, or Firm* — McCormick, Paulding & Huber LLP

(57) ABSTRACT

A device for enabling access to a structure above ground or sea level, in particular a rotor blade of a wind turbine, by lowering and/or lifting the device in relation to the structure, the device including a frame structure,—means for supporting the device in relation to the structure, and—means for lowering and/or lifting the device in relation to the structure, where at least part of the frame structure includes a track portion, the track portion being adapted to guide an, in relation to the track portion, movable object along the track portion, where the means for supporting the device in relation to the structure are configured for positioning the device in relation to the structure, and the means for supporting the device in relation to the structure are configured for facilitating a movement of the device essentially in the longitudinal direction of the structure.

43 Claims, 18 Drawing Sheets

U.S. PATENT DOCUMENTS

| | | | | |
|---|---|---|---|---|
| 4,690,246 | A  * | 9/1987 | Hornagold et al. | 182/2.3 |
| 4,921,070 | A  * | 5/1990 | Magill | 182/142 |
| 5,823,291 | A  * | 10/1998 | Goldbach | 182/141 |
| 6,357,549 | B1* | 3/2002 | Brennan et al. | 182/133 |
| 7,740,107 | B2* | 6/2010 | Lemburg et al. | 182/142 |
| 2005/0042102 | A1* | 2/2005 | Teichert | 416/146 R |
| 2006/0175465 | A1* | 8/2006 | Teichert | 244/33 |
| 2007/0007074 | A1* | 1/2007 | Lemburg et al. | 182/128 |
| 2007/0056801 | A1* | 3/2007 | Iversen | 182/141 |

FOREIGN PATENT DOCUMENTS

| | | |
|---|---|---|
| EP | 1 550 779 | 7/2005 |
| JP | 2004 293182 | 10/2004 |
| NL | 1 019 943 | 8/2003 |
| SU | 767 321 | 9/1980 |
| WO | 03/048569 | 6/2003 |
| WO | 2004/092577 | 10/2004 |
| WO | 2005/064152 | 7/2005 |

* cited by examiner

DEVICE FOR ENABLING ACCESS TO A STRUCTURE ABOVE GROUND LEVEL

TECHNICAL FIELD OF THE INVENTION

The present invention relates to a device for enabling access to a structure above ground level, e. g. of considerable height, in particular a device such as a wind turbine, a rotor blade or a tower of such a wind turbine, the device comprising a part that may be lowered and/or lifted in relation to the structure.

The invention further relates to a method of enabling access to a rotor blade of a wind turbine.

BRIEF DESCRIPTION OF RELATED ART

Within the field of wind turbines it is necessary to perform work on parts that is situated at a considerable height above ground level (or sea level, when sea wind turbines are concerned) such as e.g. repair of rotor blades, the surface of these, surface treatment of rotor blades and the tower etc. Further, it has been recognized that it is advantageous or even necessary to clean such parts and in particular the rotor blades in order to maintain good results as regards the power efficiency. Further, it may be advantageous to perform other forms of maintenance in order to achieve good power production results and optimal economic results, such as e. g. surface treatments, inspection etc.

In order to perform such work a number of hoisting arrangements have been proposed in the prior art.

Such a hoisting arrangement is known from German utility model DE 296 03 278 U in which suspension means are fastened to each of the two rotor blades near the hub of the rotor once the windmill has been brought to a stop and with one rotor blade pointing straight downwards. A special work platform with a through-going slit at the bottom has been fixed to these suspension means so that the rotor blade pointing downwards could be inserted into this slit. The work platform has subsequently been hoisted upwards in a stepwise manner, while the crew has rinsed the surface of the rotor blade manually, e. g. with one person located on each side of the rotor blade.

Even with such an arrangement, it is a time-consuming process to carry out a cleaning of the rotor blades of a windmill, just as such a known arrangement would probably require the use of machinery, such as a crane, for fixation of the suspension means. Further, the platform itself will have a considerable weight and size, thereby leading to further costs and use of heavy machinery for lifting and lowering the platform.

Devices of corresponding kind are known from DE 199 09 698 A1 and DE 43 39 638 A1, which are encumbered with the same disadvantages as those mentioned above, including that extensive use must be made of special material such as cranes, for example mobile cranes, or relatively comprehensive materials which, for example, are mounted on the turbine tower beforehand.

Further, WO 03/048569 A2 describes a method and an apparatus for treatment of a surface of a rotor blade of a windmill, where the apparatus is being placed in such a manner that it is moveable in relation to the surface of a rotor blade, and said apparatus is being caused to move depending on a form of treatment determined by means for treatment mounted on, in or next to the apparatus. In this manner, various forms of treatment of a rotor blade may be carried out such as for instance washing, finishing, sealing etc.

Furthermore, WO 2005/064152 A2 describes a device for enabling access to a structure above ground level by lowering and/or lifting the device in relation to the structure, the device comprising a first endless frame structure defining an opening, wherein at least part of the first endless frame structure forms a track portion, the track portion being adapted to guide an, in relation to the track portion, movable object, such as a gondola, along the track portion.

Both of these prior art documents relate to devices, where the devices are transferred to the rotor blade from below the rotor blade tip.

Still further, WO 2004/092577 A1 describes a method of servicing the outer components of a wind turbine such as the wind turbine blades and the tower with a work platform, said method comprising the steps of: positioning the work platform at the wind turbine tower and connecting the work platform to an upper part of the wind turbine with at least one cable. Further the method comprises the steps of raising the work platform with the cable and cable winding means to a position of use, and holding the work platform to the side of the wind turbine tower with holding means. The invention also relates to a work platform for servicing the outer components of a wind turbine.

Further, these prior art systems are generally not configured in a manner facilitating user-friendliness and do not provide the personnel with an optimal safety environment.

BRIEF SUMMARY OF THE INVENTION

The invention provides an improved device for performing such work at a structure such as a wind turbine, e. g. on a rotor blade or on a wind turbine tower.

The invention further provides such a device whereby improved user-friendliness and safety may be achieved.

The invention additionally provides such a device that allows access to virtually all parts of e.g. a rotor blade with relatively simple and few means.

The invention also provides such a device that may be designed as a relatively light structure and in relatively light materials while maintaining safety standards and even provide improvements in safety aspects.

Further, with the increasing heights and sizes of wind turbines, the above-mentioned have become increasingly more important, since the increase in wind turbine size requires corresponding service devices with increased sizes, whereby the need for a relatively uncomplicated and relatively light service device requiring only a minimum of resources has been further accentuated.

In a first aspect, the invention relates to a device for enabling access to a structure above ground or sea level, in particular a rotor blade of a wind turbine, by lowering and/or lifting the device in relation to the structure, the device comprising a frame structure,
means for supporting the device in relation to said structure,
means for lowering and/or lifting the device in relation to the structure, wherein at least part of the frame structure comprises a track portion, the track portion being adapted to guide an, in relation to the track portion, movable object along the track portion, wherein said means for supporting the device in relation to said structure are configured for positioning said device in relation to the structure, and wherein said means for supporting the device in relation to said structure are configured for facilitating a movement of said device essentially in the longitudinal direction of said structure.

Hereby, it is achieved that by means of the device the user may be able to reach or access all parts of the surface of in particular a rotor blade of a wind turbine in an expedient manner and with a minimum of equipment and manpower.

The device according to the invention, e.g. carrying a tool device or one or more persons, may be located in any vertical position along a wind turbine rotor blade, preferably controlled by a person at the device or at ground level, e.g. by controlling the means for lowering and/or lifting the device in relation to the structure. Further, the movable object may be controlled in such a manner that all parts of the rotor blade can be accessed.

Thus, a large and heavy platform is avoided, since a person using the device according to the invention may access virtually any desired position in relation to the wind turbine rotor blade. Hereby any necessary work may be performed using a relatively light construction. Further the safety standard is enhanced since a person using the device according to the invention may be secured in a reliable and dependable manner and since such a person need not move around on a platform that may e.g. be swerving under the influence of the wind and which may be slippery in moist conditions.

Furthermore, it is achieved that the device can be transferred to the rotor blade in a relatively uncomplicated manner, without using extensive machinery, while still keeping the device relatively small in relation to the size of the state of the art wind turbines.

Preferably, said frame structure may have an open configuration.

Hereby, it is achieved that the device can readily be transferred to the rotor blade at a convenient place along the length of the rotor blade instead of being placed at the rotor blade at the tip of the blade, where the distance to the tower is relatively large, thereby making such an operation relatively complex, when the size of currently used wind turbines is taken into consideration.

Alternatively, said frame structure may have a closed configuration and may be adapted for being opened, e.g. by having a releasable frame part and/or one or more frame parts that are pivotal.

Hereby, it is also achieved that the device can readily be transferred to the rotor blade at a convenient place along the length of the rotor blade in a relatively simple manner.

According to an advantageous embodiment, said means for supporting the device in relation to said structure may be adapted for supporting the device in relation to a front edge, a rear edge and/or a side part of said structure, e.g. a rotor blade of a wind turbine.

Hereby, it is achieved that the device can travel along the rotor blade in a controlled manner, supported against suitable parts of the structure, where the surface of the rotor blade is not subjected to any harmful contact, i.e. since the device is designed for contacting the parts of the rotor blade having the necessary rigidity and sturdiness. Thus, the device may also be designed for supporting against the side of a rotor blade.

According to a further advantageous embodiment, said means adapted for supporting the device in relation to a front and a rear edge of said structure, e.g. a rotor blade of a wind turbine, may be displaceable, e.g. in the lateral direction and/or the longitudinal direction of the device.

Hereby, the device can readily travel along the length of the rotor blade, while the support means are automatically adapted to the actual size and/or shape of the rotor blade. Furthermore, the transfer of the device from the tower to the blade is facilitated in this manner.

Preferably, said means adapted for supporting the device in relation to a front edge of said structure, e.g. a rotor blade of a wind turbine, may be in the form of elongated rollers that may be angled in relation to each other and that further may be inclined e.g. downwards and/or upwards, depending on the direction of movement.

Hereby, the front edge support can be designed in a relatively simple manner and furthermore in such manner that adjustments can be kept at a minimum.

According to a preferable embodiment, said means for supporting the device in relation to said structure may be adapted for supporting the device in relation to a rear edge of said structure, e.g. a rotor blade of a wind turbine.

Hereby, it is achieved that the device can travel along the rotor blade in a manner, where the surface of the rotor blade is not subjected to any harmful contact, i.e. since the device is designed for contacting the parts of the rear edge of the rotor blade having the necessary rigidity and sturdiness, e.g. a region near the rear edge on both sides of the blade.

Preferably, said means for supporting the device in relation to said structure may comprise a rear guide and support arrangement comprising a plurality of wheels or the like, at least one of which adapted for supporting against either side of the structure, e.g. said rotor blade.

Hereby, it is achieved that said plurality of wheels are expediently arranged on a common unit.

Advantageously, said plurality of wheels or the like may be carried by wheel carriages, which facilitate a movement in the lateral direction of the device, e.g. towards said rotor blade.

Hereby, the control of the position of the wheels in relation to the rotor blade is facilitated, e.g. in view of the varying size of the rotor blade along the length. Further, it is noted that the carriages may be equipped with various actuators for moving the wheels as well as various sensors for measuring e.g. the force or pressure with which the wheels are influencing the rotor blade or vice versa.

Preferably, said front guide and support arrangement may be movable in the longitudinal direction of the device.

Hereby, the control of the position of the wheels in relation to width and/or position of the rotor blade is facilitated.

Advantageously, said means for supporting the device in relation to said structure may comprise a front guide and support arrangement.

Preferably, said front guide and support arrangement may comprise a plurality of rollers or the like, which are pivotable in relation to the frame structure.

Hereby, the front edge support can be designed in a relatively simple manner, whereby the need to perform adjustments can be kept at a minimum. Furthermore, since the rollers are pivotable in relation to the frame structure, the frame can be opened in a simple manner when the device is transferred to the rotor blade or when the device is released from the rotor blade in order to return to the tower.

According to a further preferable embodiment, said front guide and support arrangement may comprise a plurality of rollers or the like, which are designed with a cylindrical middle part and end parts with the diameter being reduced towards the ends, e.g. with a conical or a torpedo shape at each end, whereby the need to adjust the inclination in the vertical plane may be avoided, e.g. since the movement of the rollers along the front edge of the rotor blade will be self-regulating in nature. Furthermore, the rollers may be designed with a surface having a suitable friction characteristic, e.g. a small friction.

According to a further preferable embodiment, the device may further comprise means for supporting the device in relation to a nearby structure, e.g. a wind turbine tower.

Hereby, the lifting and lowering of the device along the tower is facilitated.

Advantageously, said means for supporting the device in relation to a nearby structure may be configured for displacing the device in relation to said nearby structure, e.g. when the device is transferred to or removed from said structure, e.g. a rotor blade of a wind turbine.

Hereby, the operations performed when the device is transferred to the rotor blade or returned to the tower again are facilitated.

Preferably, said means for supporting the device in relation to a nearby structure may be configured for adjusting the position, e.g. the angle of the device in relation to said nearby structure.

Hereby, it is achieved in a relatively simple manner that the device can be controlled with great accuracy, when for example it has reached a height where it is desired to contact the rotor blade. This may be of particular importance when operating in windy conditions.

According to a further aspect of the invention, said means for supporting the device in relation to a nearby structure may be configured for supporting against said nearby structure at least at two points in the vertical direction, and wherein means for supporting the device at least at one of these points are adjustable in relation to the nearby structure, e.g. the surface of a wind turbine tower.

Hereby, it is achieved that the device can be transported along the surface of the tower, even when the surface comprises obstacles or the like, for example in form of flanges or the like or in the form of various equipment such as for example antennas that are located at the tower.

Still further, the frame structure may comprise a track for carrying an object.

Hereby, the desired flexibility of the device is achieved in an expedient manner since the object may be moved along the circumference of the rotor blade, whereby the complete surface of the rotor blade can be accessed, e.g. via the track that may be designed in various manners.

Preferably, the object may comprise a work platform adapted to carry one or more individuals.

Further, the object may comprise a tool, a robot, an apparatus etc. for performing an operation on the rotor blade in a more or less automated manner.

Still further, the object may comprise two or more work platforms, gondolas, tools, robots, apparatuses, etc.

Advantageously, said two or more work platforms, gondolas, tools, robots, apparatuses, etc. may be independently movable. Hereby, it is achieved that e.g. two persons or more may be working individually, e.g. at each side of the rotor blade, whereby the device can be utilized in a fully efficient manner.

According to a further preferable embodiment, one of said two or more work platforms, gondolas, tools, robots, apparatuses, etc. may be configured as a master unit and the other(s) may be configured as slave unit(s).

Hereby, it is achieved that the primary control of the device can take place from the master unit, e.g. the control of the height of the device, the transfer to and from the rotor blade etc., which evidently can not be controlled by a plurality of persons or objects in an efficient manner, whereas the control of the position of the individual platforms along the perimeter of the rotor blade, the angular position of the work platforms etc. can efficiently be performed from each of the individual units.

Advantageously, said two or more work platforms, gondolas, tools, robots, apparatuses, etc. may be configured for being connected together to form a single gondola, work platform, tool, robot, apparatus, etc.

Hereby, a flexible design of the device is achieved, allowing the objects, e.g. work platforms, tools, robots, apparatuses, etc. to be used in any desired manner and in view of the actual circumstances.

Preferably, the object may comprise seating for one or more individuals.

Advantageously, the object may comprise control means for controlling the position of the object in relation to the track portion.

Hereby, the person or the persons using the device may control the device and in particular their own position, e.g. work position in relation to e.g. the surface of a rotor blade, in an optimal manner. Further, the work platform may comprise control means for controlling the lifting/lowering and the positioning in relation to the structure, which control means may be in the form of a joystick or the like and by means of which any controllable part may be individually controlled and/or controlled simultaneously with other parts. Further, it is noted that a gyroscopic arrangement may be included in the control system.

Preferably, the frame structure may form an essentially elongated structure.

Hereby, the device can efficiently be used for e.g. servicing a wind turbine rotor blade, since the elongated configuration provides the possibility of reaching all parts of the surfaces of the rotor blade, when the device is moved along the rotor blade. It is noted that even though the frame structure has been exemplified as having an essentially U-shaped form, various other forms are possible. It should be mentioned that for example rectangular, triangular, circular, oval forms etc. may be used as well. Further, forms having an L-shape, V-shape, etc. may also be used, and it is noted that forms allowing access to a restricted part only of the rotor blade, for example only one side of the rotor blade, are possible and are within the invention as characterized in the claims.

In accordance with a further preferable embodiment, said means for lifting and/or lowering the device in relation to the structure may comprise power means such as electric motors, electric, electronic, hydraulic and/or pneumatic means for lifting, lowering and/or displacing the device in relation to the structure.

Hereby, the device will be able to lift and/or lower itself without power assistance from e.g. a hoist located at a vehicle or a vessel. Thus, the device will be able to operate independently, e.g. without concern for power assistance from other devices. This further enhances safe operation since accidents caused by a power failure at a ground vehicle or a vessel are prohibited. Particularly when operation at sea is concerned, e.g. at sea wind turbines, such an independent configuration is preferable since a support vessel may be unstable, e.g. subjected to waves, current, wind etc. Thus, an arrangement at sea where a vessel provides the elevation by e.g. hoist(s) located on the vessel is prone to accidents and malfunction, and therefore a device comprising power means as mentioned above is advantageous not only in general but especially at sea.

Further, it is noted that even when power supply to such a device is subjected to failure, e.g. when electric power is cut off, a device according to the invention will be able to be manually operated, e.g. to be hoisted to the ground and will in general present a safe work tool for all involved, in particular persons occupying the device.

Advantageously, the device may further comprise control means for controlling the lifting and/or lowering means.

Such control means may be controlled from a platform as explained above or from e.g. ground level, for example when an automated operation is taking place.

Advantageously, the device may be adapted to assist individuals in performing inspection, work, repair, surface treatment etc. on a rotor blade of a wind turbine.

According to a particular advantageous embodiment, said one or more objects guided by said track portion, e.g. an object in the form of a work platform, a gondola, a tool, a robot, an apparatus, etc. may comprise means for adjusting the position in relation to said track portion, e.g. transverse to the direction of the track portion.

Hereby, it is achieved that in instances, where an object being guided by the track portion is not positioned optimally in relation to the rotor blade, e.g. at a suitable work distance, the object can be displaced until it reaches the desired distance. This may be particularly important, where the track portion has a gap, for example at the open end of the frame structure of the device, e.g. at the front edge of the rotor blade. The adjustment or displacement of the object may be achieved in various manners, for example by having the object being suspended in an S-shaped suspension, which can be rotated, whereby the adjustment is performed in a circular motion. Further the adjustment can be performed via a linear movement, for example using a linear actuator, a beam structure or the like Expediently, said means for lifting and/or lowering the device in relation to the structure may be connected to one or more lines, wires or the like.

Such wires or lines etc. may be connected to any suitable location on the wind turbine, e.g. the nacelle, the hub, the tower etc., and they may be permanently fixed. Furthermore, it is noted that in accordance with the invention, the device can be operated using only two such lines or wires, one connected at a point near the rear of the device and one connected to a point along the length of the frame structure. As it is explained herein, the device is balanced, e.g. by adjusting the position of one or both of these connection points, for example on the basis of measured parameters and/or gyroscopic inputs. Further, it is noted that by such an arrangement it is achieved that during the operation of the device, the lines or wires will not get in contact with the rotor blade.

According to a particular advantageous embodiment, the device may further comprise means for changing the direction of one or more of the lines or wires, by means of which the device is hoisted, lifted and/or lowered with, thereby altering the balance of the device.

Hereby, a balancing of the device as described above is facilitated.

According to a still further aspect of the invention, the device may further comprise dampening means for performing a dampening action of the device in relation to said structure, e.g. a wind turbine rotor blade or tower.

Since the device may be used and operated at considerable heights, it is apparent that the structure itself, e.g. the wind turbine, and the device, for example the frame structure, a work platform, a gondola etc. will be affected by the environment, e.g. influenced by the wind, turbulences, etc. In order to counteract such influences, the device according to any of the embodiments described herein may be equipped with means for effecting a dampening of the undesired influences. Such dampening means may be passive, but preferably or in addition to passive dampening means active dampening means may be used. Such active dampening means may be controlled by control means, for example integrated with the central control means for the device, and the control of the active dampening means may take place on the basis of input signals from e.g. sensor means, by means of which for example wind speed, turbulence, vibrations etc, may be measured. Hereby it is achieved that the mass of the device including work platform, gondola, personnel, tools, etc. may be used to dampen the movements of the structure itself, for example a rotor blade, in such a manner that even in windy conditions the structure, e.g. a rotor blade, will be stable and relatively immobile. Hereby, the working conditions including the safety of the personnel are also improved considerably.

Expediently, said dampening means may be passive dampening means.

Preferably, said dampening means may be active dampening means, whereby an enhanced efficiency is achieved.

Advantageously, said active dampening means are controlled by control means.

Advantageously, said active dampening means may be controlled on the basis of input signals from e.g. sensor means such as e.g. wind sensors, accelerometers, etc.

Expediently, said device may comprise a control system for automatically controlling actuators, hoisting means etc. of the device on the basis of control input from e.g. gyroscopic sensor(s), pressure sensor(s), optical sensor(s), strain gauge sensor(s) and/or other sensors.

Hereby, at highly automated operation of the device is achieved and furthermore, an enhanced user friendliness and an enhanced efficiency is achieved since for example the user need not to attend to various compensative control operations in order to counteract changing wind, changing balance as the device is moved up and down etc., but can concentrate on the work that has to be performed.

According to a further advantageous embodiment, said device may be adapted for being permanently fixed at said structure, e.g. at a nacelle of said wind turbine, and adapted for being operated by lowering and transferring the device to a rotor blade.

Hereby, a practical solution is provided for the wind turbines that are being built and will be built with considerable heights and sizes, where the permanent allocation of a device in accordance with the invention is justified, e.g. when taking into account the time and resources needed for lifting a device to the necessary level, e.g. 200-400 meters or more above ground level.

Furthermore, the invention relates to a method of enabling access to a rotor blade of a wind turbine, whereby a device comprising a frame structure, means for supporting the device in relation to said structure, and means for lowering and/or lifting the device in relation to the wind turbine is placed near said wind turbine essentially at ground or sea level, the device is lifted in relation to said wind turbine by means of at least one line, wire or the like connected to said wind turbine, when the device has reached a suitable level, the rotor blade is contacted by support means at an edge of the rotor blade, which support means are movable in relation to said device, at a higher level contact to the rotor blade is established by support means at both edges of the rotor blade, and the device is lifted and/or lowered in relation to the rotor blade while supported by said support means at both edges of the rotor blade.

Hereby, it is achieved that access to a rotor blade at a wind turbine can be effected in an expedient manner using a device for performing e.g. service operations, when the device is lifted along the rotor tower and transferred to the rotor blade not at the tip of the rotor blade, but at a level, where the distance from the tower to the rotor blade is convenient. Hereby, a number of advantages are achieved, including reduced costs and resources.

Preferably, one or more objects in the form of a work platform, a gondola, a tool, a robot, an apparatus, etc. may further be attached to a track portion of said device before lifting said device in relation to the wind turbine.

Hereby, it is achieved that the device may be made ready for operation in an expedient manner, for example when the device is transported to the actual work site on e.g. trailer or a similar transport means, the frame of the device is connected to the lines or wires, lifted a suitable distance and the necessary number of work platforms, gondolas, tools, robots, apparatuses, etc, e.g. one or two, is/are connected to the track portion, before the device if lifted upwards. Similar applies when the device is returned to the ground.

Expediently, said device may be supported in relation to the tower of the wind turbine while being lifted.

Hereby, it is achieved that the device is lifted and/or lowered in a stable and controlled manner.

Advantageously, said step of establishing contact to the rotor blade at both edges of the rotor blade may be performed at a level at or near "chord max"-level, and/or at a level where a minimum distance between the front edge of the rotor blade and the tower exists.

Hereby, the transfer of the device can be effected in a particular simple manner and in a manner whereby the size, weight, complexity etc. of the device in relation to the size of the wind turbine is minimized.

Expediently, the wind turbine is initially arranged with a rotor blade essentially vertical and with the rear edge of the rotor blade near the tower.

Hereby, optimal working conditions are achieved, e.g. with the edge of the rotor blade facing any possible wind and whereby the device may expediently contact the edge as soon as possible when being lifted upwards, whereby increased stability is achieved.

BRIEF DESCRIPTION OF THE FIGURES

The invention will be described in detail in the following with reference to the drawings, in which.

DETAILED DESCRIPTION OF THE INVENTION

Figure 1:
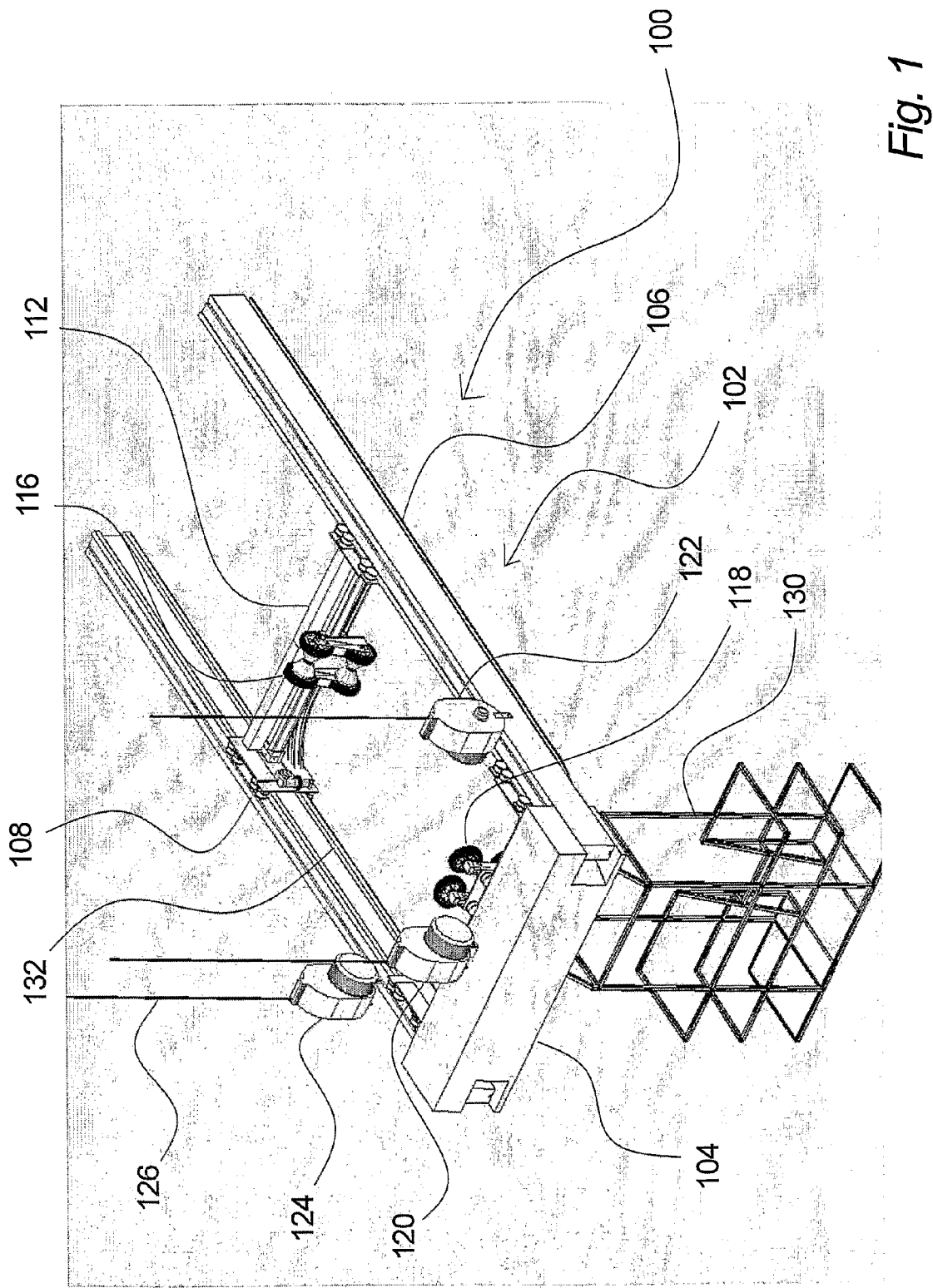
FIG. 1 shows a device according to a first aspect of the present invention in a perspective view.
Figure 2:
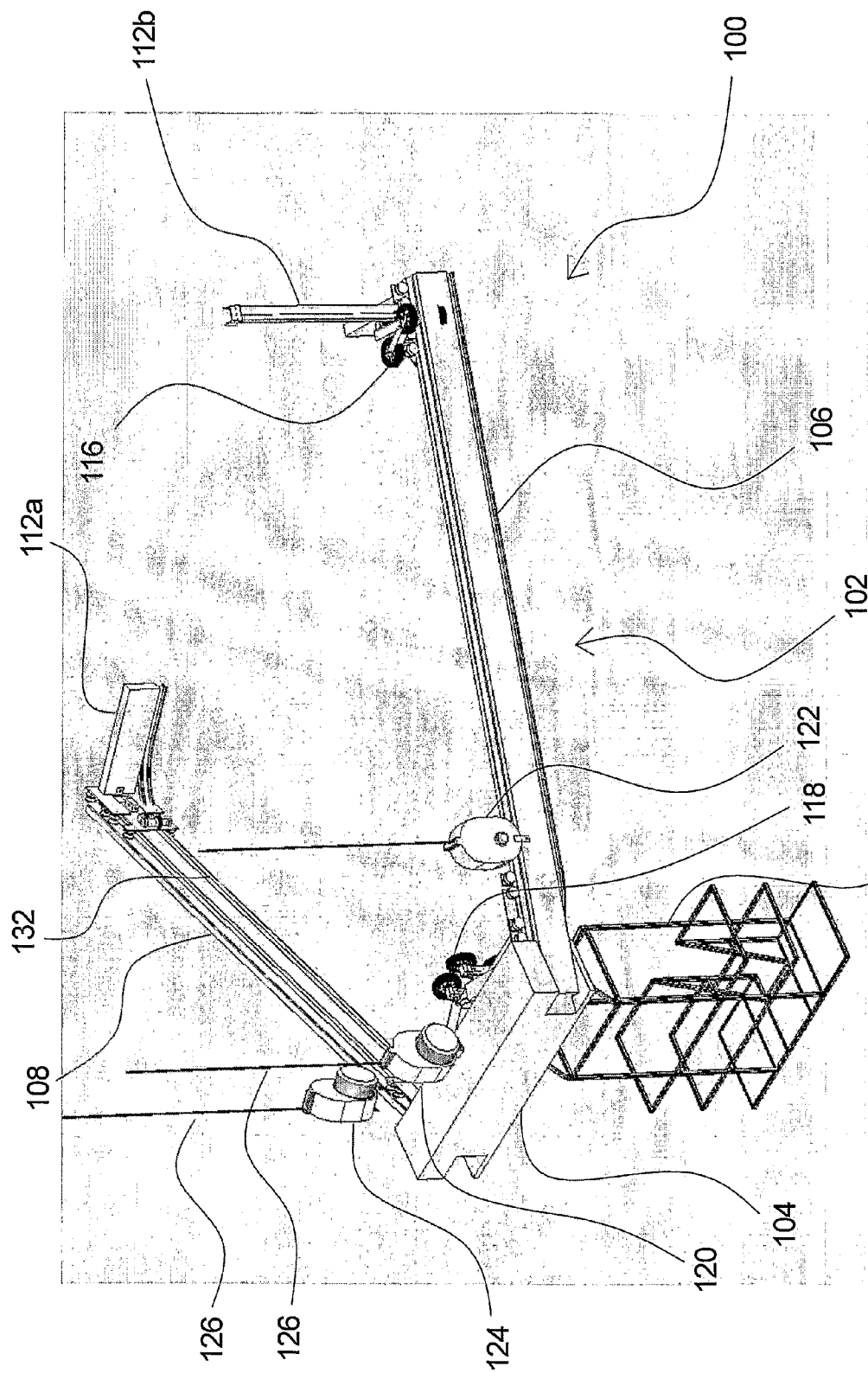
FIG. 2 shows the device show in FIG. 1, but with the frame in an open configuration.

In FIGS. 1 and 2 a device 100 according to a first aspect of the present invention is shown in a schematic manner. This device comprises a frame 102, which has a support structure 104, e.g. in the form of a beam, a beam structure, a lattice structure or the like. A pair of frame legs 106 and 108 are connected to this support structure 104 and further a front cross-bar or traverse 112 is located between these frame legs.

The device 100 can be elevated by means of a number of hoisting means, e.g. a hoist 120, which is connected to the support structure 104 and a further hoist or plurality of hoists, e.g. a pair of hoists 122 and 124 as shown, which each are connected to one of the frame legs 106 and 108. These hoists, which may be electric, electric, electronic, hydraulically or pneumatically driven, comprise lines or wires 126, which may be connected to fixing points at e.g. the top of a wind turbine tower, nacelle etc.

The device comprises a front guide and support arrangement 116, which comprises a number of rollers or wheels for example four as shown, and a rear guide and support arrangement 118, which also comprises a number of rollers or wheels. The front guide and support arrangement 116 is placed on the front cross-bar or traverse 112, and the rear guide and support arrangement 118 may be placed on the support structure 104 or on a separate cross-bar or traverse (not shown). These guide and support arrangements may each be moved independently in the lateral direction, and further the cross-bar(s) or traverse(s), on which they are placed, may be moved in the longitudinal direction.

Further, the device 100 comprises a track 132, that possibly may be an endless track or a track corresponding essentially to the length of the legs 106 and 108 and the part of the support structure 104 connecting these. On this track a gondola or work platform 130 is supported in such a manner that the gondola can be located at preferably any position along the frame 102. as it will be explained later, more than one work platform 130 can be carried by the device 100.

As shown in FIG. 2, the frame 102 may be opened, e.g. by disconnecting the front cross-bar or traverse 112, that may comprise a number of subparts 112*a* and 112*b*, and by pivoting one or both of the frame legs 106 and 108. As it will be explained later on, the frame 102 may be opened by pivoting both the subparts 112a and 112b, for example to a vertical position as shown for the subpart 112b.

Figure 3:
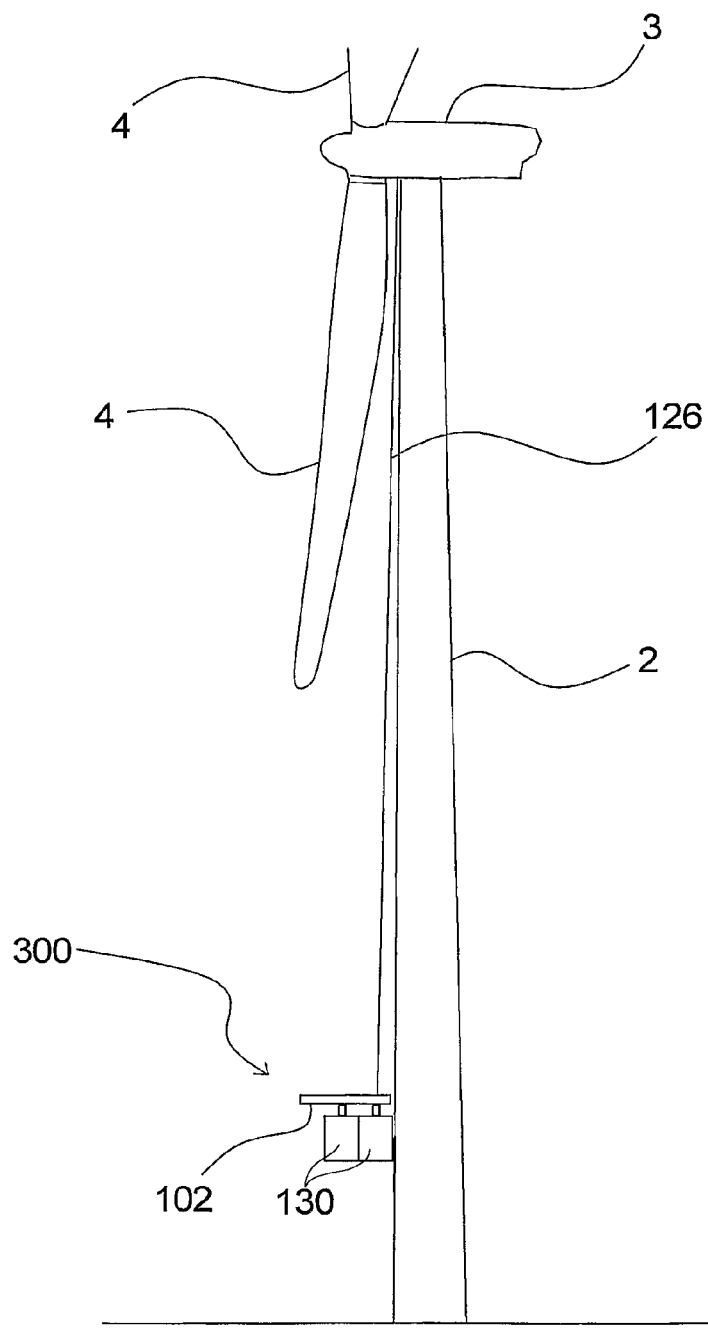
FIGS. 3-6 show the functional features of the device according to this embodiment in connection with a wind turbine.

The use of the device 100 will be explained in further detail with reference to FIGS. 3-6, which illustrate the device 100 in schematic manner, e.g. showing the frame 102 with the gondola 130 placed underneath the frame. The device 100 has been placed at a wind turbine, e.g. near the tower 2. The rotor blades 4 have been stopped in a position with one of the blades pointing downward and with the rear edge of the blade 4 facing the tower 2. The wires or lines 126 have been connected to fixing points at the top of the wind turbine, e.g. at the tower 2, at the nacelle 3 or at the hub. and the device 100 is being elevated as shown in FIG. 3, i.e. using the hoists 120, 122 and 124. The device may be supported against the tower 2 during the elevation, e.g. by means of rollers or the like placed on the frame 102 and possibly on the gondola 130.

Figure 4:
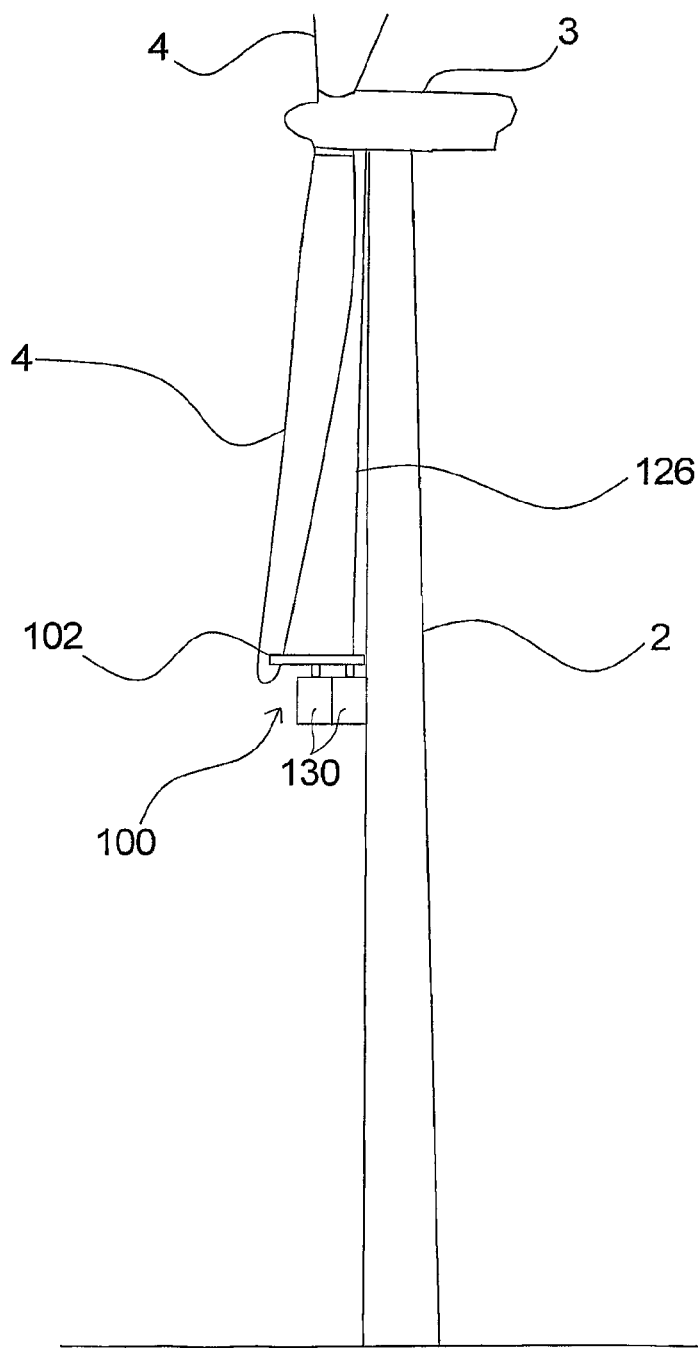

When the device is being elevated, the frame is open, for example as shown in FIG. 2, at least when the device reaches the level of the tip of the rotor blade 4 as shown in FIG. 4 thereby allowing the rotor blade to gradually enter the inner space of the frame 102.

Figure 5:
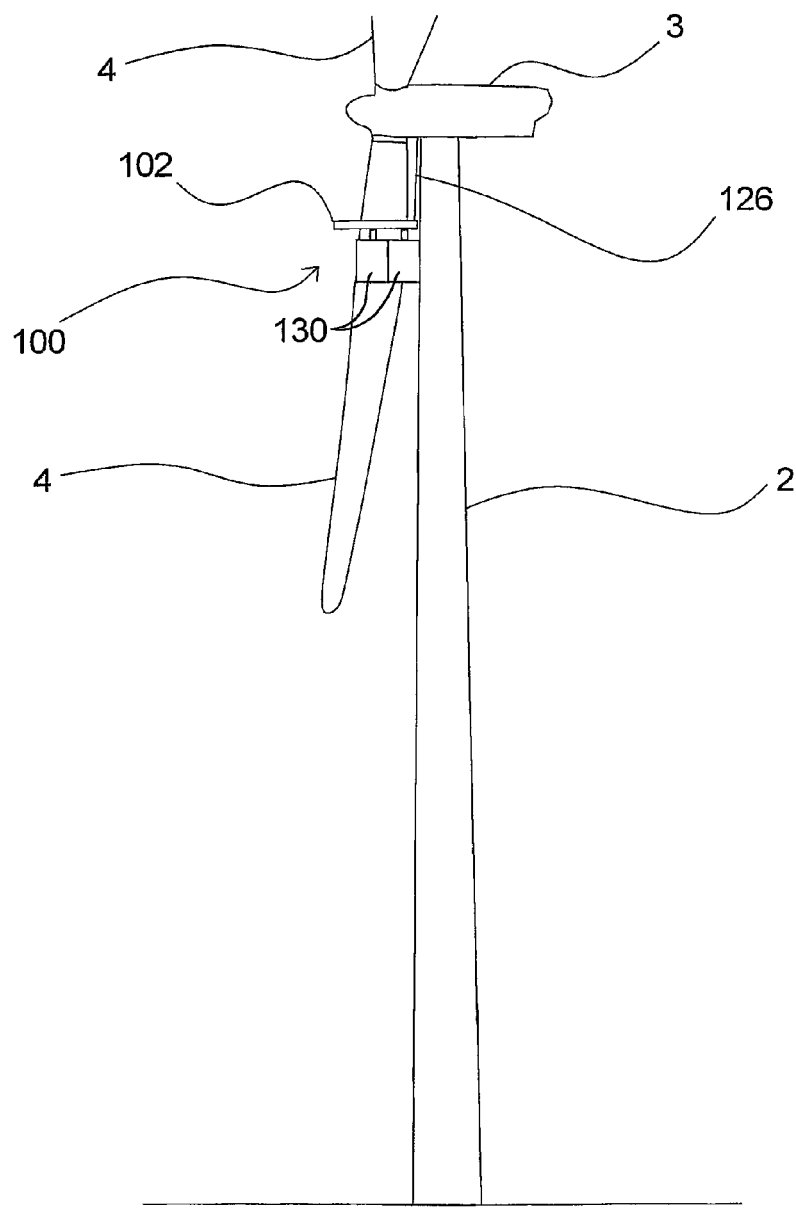

When the device 100 has reached a level, e.g. as shown in FIG. 5, where the frame 102 may be closed around the rotor blade, the frame legs 106 and/or 108 are moved to the closed position and/or the front cross-bar or traverse 112 is connected again, thereby establishing the closed frame structure. It will be understood that the rear edge of the rotor blade, which is facing the tower, will be supported by means of the rear guide and support arrangement 118 (cf. FIG. 2), and that the front guide and support arrangement 116 will be placed in such a manner that it will engage the front edge of the rotor blade, e.g. by moving the front cross-bar or traverse 112 in the longitudinal direction and/or by moving the front guide and support arrangement 116 to either side along the traverse 112. It will also be understood that the rear guide and support arrangement 118 likewise may be moved in the longitudinal direction and/or the lateral direction.

Figure 6:
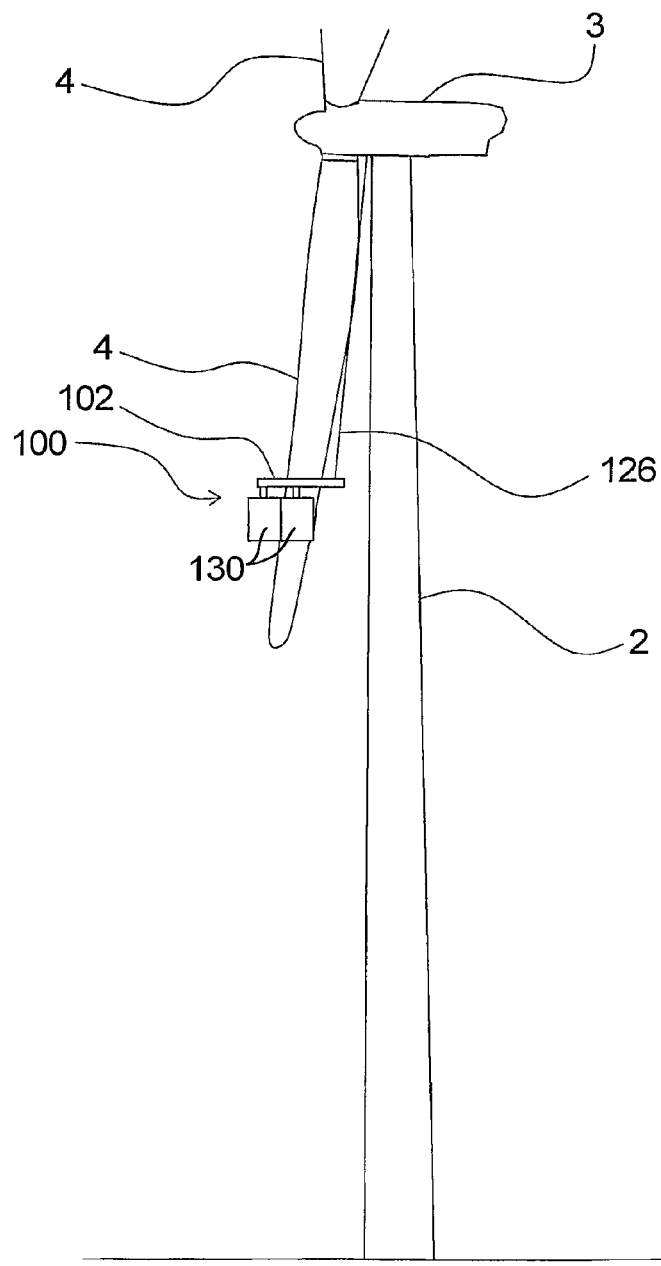

When the frame 102 has been closed and the support arrangements have been brought into contact with the rotor blade, the device 100 may now be lowered and/or lifted along the rotor blade 4 as shown in FIG. 6 by means of the hoist 120, 122 and 124 and the lines 126, and the gondola 130 may be moved along the track 132 to essentially any position at the rotor blade.

It is noted that at least some of the hoists 120-124 may be displaced, e.g. along the the support structure 104 and/or along the frame legs 106 and 108 as shown in FIGS. 1 and 2 in order to achieve e.g. a desired balance.

When the necessary work has been performed on the rotor blade 4, the device 100 will be brought to the position as shown in FIG. 5 before the frame 102 is opened again etc. and the device is being lowered downwards.

Figure 7:
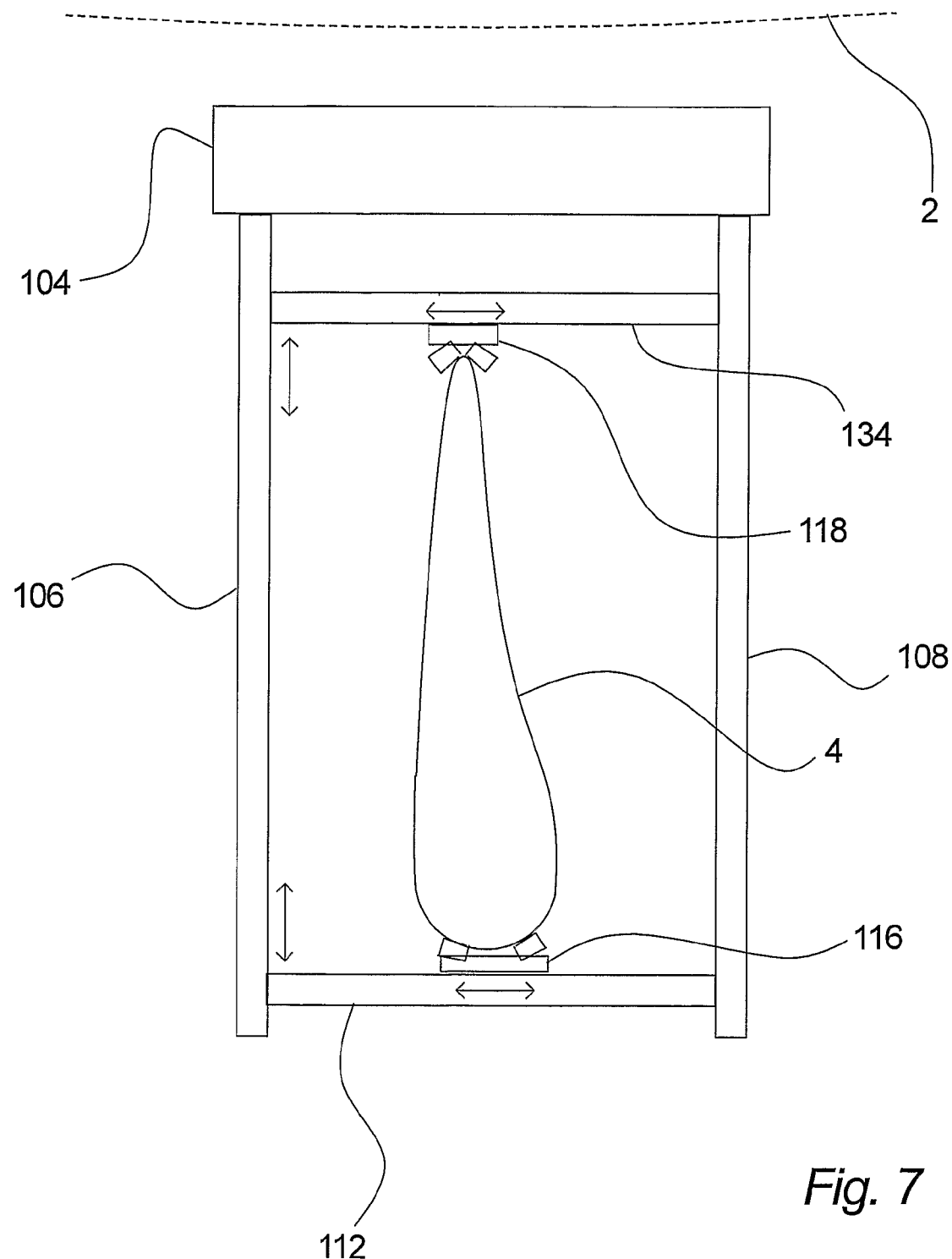
FIG. 7 shows the device in a schematic manner seen from above and in connection with a rotor blade.

The device 100 according to this embodiment will be further explained with reference to FIG. 7, which shows the device in a highly schematic manner seen from above and in connection with a rotor blade 4. As explained, the gondola (not shown in FIG. 7) will be able to travel along a track, which is placed on the frame 100, e.g. along at least part of the two legs 106 and 108, possibly along the front traverse 112 and possibly along at least part of the support structure 104 or along a rear traverse 134, if such a rear traverse is present. Thus, it will be understood that the distance from the surface of the rotor blade to the gondola may be considerable, at least at certain locations along the length of the rotor blade, since the frame will have to have a sufficient size to accommodate the largest dimensions of the rotor blade. Therefore, in order to achieve an optimal distance, the two guide and support arrangements 116 and 118 may be designed to be able to move in the lateral direction as shown with the arrows, depending e.g. on the actual position of the gondola. As previously explained, one or both of these two guide and support arrangements 116 and 118 may also be designed for moving in the longitudinal direction of the frame, e.g. by moving the front traverse 112 and/or a rear traverse 134 as also indicated in FIG. 7.

It is apparent that this embodiment of the invention may be used as explained in connection with the other embodiments described herein for a wide variety of applications and that the features that have been described in connection with these other embodiments and as characterized in the claims, also may find use in connection with this aspect of the invention.

A further embodiment according to this aspect of the invention will be described with reference to FIG. 8, which shows a device 100 that in general is similar to the device shown in FIGS. 1 and 2, although with a few important differences. Thus, the device 100 shown in FIG. 8 comprises a frame 102 that has a rear support structure 104, a pair of frame legs 106 and 108 and further a front cross bar or traverse 112.

Figure 8:
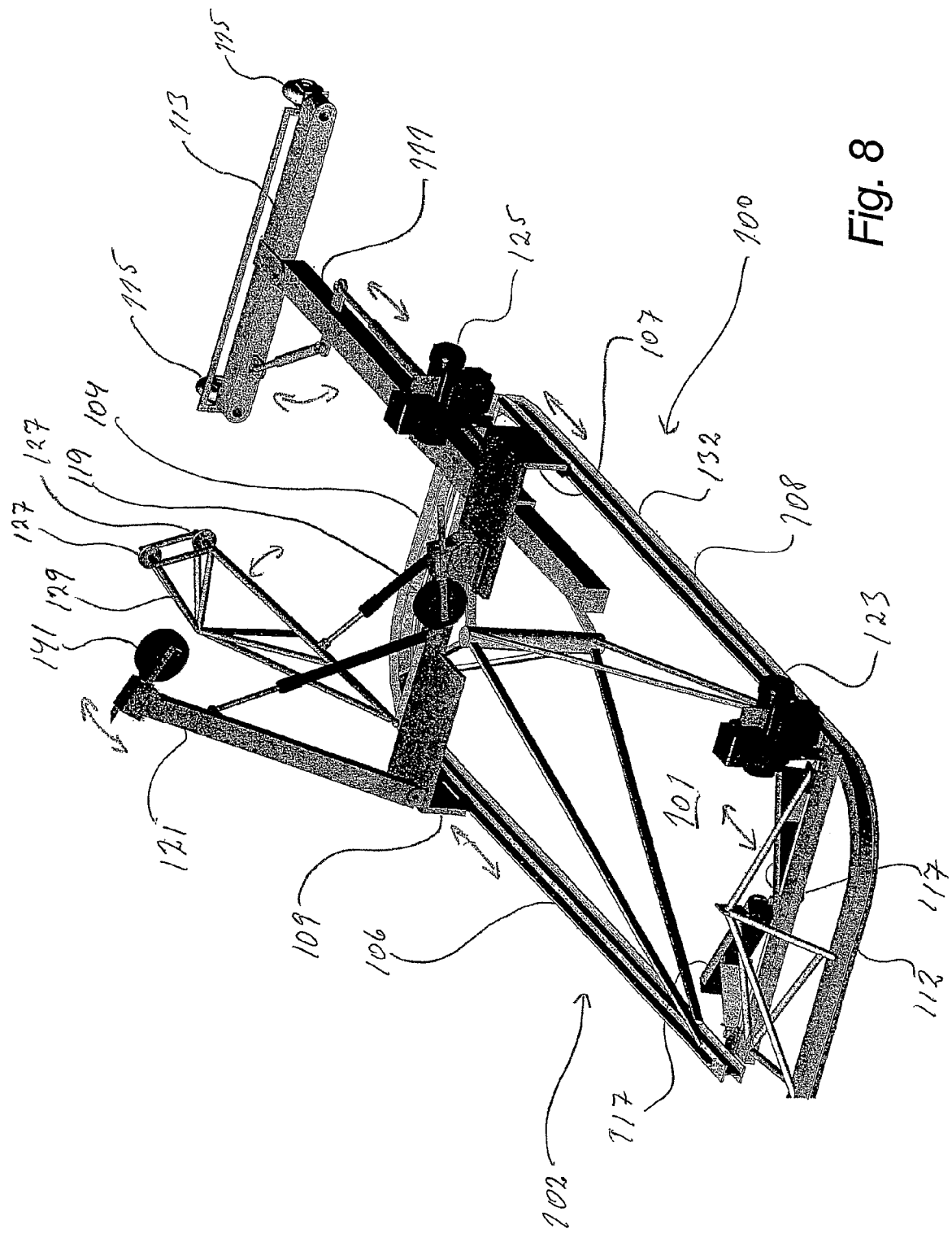
FIG. 8 shows a device according to a further embodiment of the present invention in a perspective view.

The frame legs 106 and 108 are according to this embodiment rigidly connected to the rear support structure 104, whereas the front cross bar 112 is connected to e.g. the frame leg 108 in such a manner that it may be pivoted, for example turned upwards and/or outwards, whereby the frame 102 may be seen as having a general U-shape, and whereby this U-shape may be closed when the front cross bar 112 is turned back to the position shown in FIG. 8. As shown in FIG. 8, the front cross bar 112 need not actually connect the two frame legs 106 and 108, when it is in the "closed" position.

It is clear that the frame 102 of this device, which also comprises a lattice strengthening construction connected to the frame 102, will also define an inner space 101 for accommodating a rotor blade or a similar structure.

The front cross bar 112 comprises also a front guide and support arrangement 117, corresponding to the front guide and support arrangement 116 shown in FIG. 1, but here comprising a pair of elongated rollers. These rollers 117 are angled in relation to each other, substantially providing a V-shaped arrangement for accommodating the front edge of the rotor blade. Furthermore, these rollers 117 may be inclined in the vertical plane as well, i.e. being tilted with their outer ends slightly downwards or slightly upwards and adjusted in the these positions. This will serve to facilitate an optimal movement between the device and for example a rotor blade, since the inclination of the rollers will prevent an undesirable friction between the rollers and the rotor blade when the device is moving upwards or downwards, respectively.

Furthermore, the device 100 has a rear adjustable support 111 comprising a cross beam 113 having for example a pair of wheels 115 or the like for supporting against e.g. the wind turbine tower as the device is being hoisted to the upper part or the wind turbine. The rear adjustable support 111 can be adjusted in relation to the frame 102 of the device 100. For example, it may be moved close to the frame 102, for example when the device is being hoisted up or down, and when the device has reached a height, where the rear edge of the rotor blade 4 is at a suitable small distance from the tower 2, in many practical instances a minimum distance, cf. FIG. 5, the rear adjustable support 111 can be controlled to move the cross beam 113 with the pair of wheels 115 away from the frame 102, thereby pushing the frame 102 that has been opened, e.g. the front cross bar or traverse 112 has been turned upwards, to a position where the rotor blade is fully positioned in the inner space 101. Hereafter, the front cross bar or traverse 112 can be closed again, and when the rear adjustable support 111 is retracted again, the device will be supported against the front edge of the rotor blade by means of the rollers 117.

As also described in connection with FIGS. 1 and 2, the device 100 can be elevated by means of a number of hoisting means, e.g. a hoist 123 and a hoist 125 as shown in FIG. 8, which is connected to the frame, in the shown example to the frame leg 108 only. These hoists, which may be electric, electric, electronic, hydraulically or pneumatically driven, comprise lines or wires (for reasons of clarity not shown in FIG. 7), which may be connected to fixing points at e.g. the top of a wind turbine tower, nacelle etc. In comparison with the device shown in FIGS. 1 and 2, it is noted that the device shown in FIG. 8 has fewer hoisting means, e.g. two as shown that furthermore may be located on one and the same side of the rotor blade. Thus, the number of lines is reduced, thereby making the device more flexible and easy to work with. The reduction of the number of hoisting means is accomplished since the device is equipped with features for supporting and/or balancing the device, when it is hanging in the lines, as it will be explained in the following.

As also shown in FIG. 8, the device 100 may have side controlling wheels 119 and 141, that may support the device against the sides of the rotor blade preferably near the rear edge of the blade The side controlling wheel 119 is placed on a first wheel carriage 107 that is configured for being moved along the frame leg 108 as indicated. As shown this first wheel carriage 107 may also serve to at least partly carry the rear adjustable support 111. The wheel 119 may thus be moved in the longitudinal direction of the frame 102, for example in order to adapt the position to the size and shape of the rotor blade, and the wheel 119 can also be adjusted in relation to the surface of the rotor blade, e.g. moved closer towards or farther away from the axis of the rotor blade.

The side controlling wheel 141 is placed on a second wheel carriage 109 that is configured for being moved along the frame leg 106 as indicated. The wheel 119 may thus be moved in the longitudinal direction of the frame 102, for example in order to adapt the position to the size and shape of the rotor blade. As shown, the wheel 141 is located on a pivotable support arm 121, whereby the wheel 141 can also be adjusted in relation to the surface of the rotor blade, e.g. moved closer towards or farther away from the axis of the rotor blade.

It is noted that the wheels 119 and 141 are located at different levels, also in relation to the frame 102, and that they, and in particular the higher placed wheel 141, may serve to balance and stabilize the device in relation to the rotor blade. In this respect it is noted that this is of particular importance since the device is hanging from a few lines from e.g. the top of the wind tower, the nacelle, the hub of the rotor blade or any other suitable spot. Thus, the device will try to take a position influenced by gravity and in order to gain a stable position, the side controlling wheels 119 and 141 are adjusted as explained above.

A further means of performing a balancing is represented by the line guiding arm 129 that has a pair of line pulleys 127 for guiding the line from the hoisting means 125 to the point, where the line is fixed e.g. at the top of the wind turbine tower, nacelle, hub etc. This line guiding arm 129 is pivotable and the top of this arm may thus be moved closer toward the centre line of the device or farther away from the centre line. Thus, the effective support point for the line to the hoisting means 125 can be moved in relation to the device, meaning that the device will be suspended at two points, one being the location of the hoisting means 123 at one "corner" of the device 100, and the other being the location of the top of the line guiding arm 129 that may be moved essentially from the diametrically opposed "corner" of the frame to the "corner", where the hoisting means 125 is located. It will thus be understood that hereby also a balancing of the suspended device is achieved.

As it has explained above, the device shown in FIG. 8 is configured for being used in the following manner. The device is lifted up from the ground or sea level by means of the hoisting means 123 and 125, while the rear adjustable support 111 travels along the tower. The frame 102 is opened, e.g. the front cross bar 112 is tilted upwards.

When the device is at a suitable height, where the distance to the rotor blade is convenient, e.g. in view of the distance to the front edge of the rotor blade and/or the rear edge of the rotor blade, for example at or near the location usually referred to as "chord max", and/or where the distance to the front edge of the rotor blade is at a minimum or at least sufficiently small, the movement upwards is stopped and the rear adjustable support 111 is controlled to push the opened frame closer to the rotor blade, until the front cross bar 112 can be moved e.g. downwards again. Hereafter, the rear adjustable support 111 may be retracted, whereby the device now will support against the rollers 317. Furthermore, during these operations or afterwards, the two wheel carriages 107 and 109 may be moved from the end of the frame 102 towards the rotor blade until they are near the rear edge of the blade, and the wheels 119 and 141 can be moved inwards until they support against the surface of the rotor blade. If necessary, they can be adjusted until a suitable balance is achieved. Further, the line guiding arm 129 may be adjusted as explained above.

It is noted that the two wheel carriages 107 and 109 may be moved from the end of the frame 102 towards the rotor blade until they are near the rear edge of the blade, and the wheels 119 and 141 can be moved inwards until they support against the surface of the rotor blade, before the rear adjustable support 111 may be retracted. Thus, it will be understood, that the device may be secured and balanced in relation to the rotor blade, before the support in relation to the tower is removed. Furthermore, it will be understood that it is of importance that the distance between the tower and the rear edge of the rotor blade is of such a magnitude that the wheels 119 and 141 can get in contact with the rotor blade, when the device is transferred to the rotor blade. It will also be understood that it is important that the distance to the front edge of the rotor blade allows the device to be secured to the rotor blade at the front, e.g. by "closing" of the frame, for example when the front cross bar 112 is moved e.g. downwards again and the rollers 117 are brought in contact with the rotor blade. Further, it is noted that the wheels 119 and 141 can get in contact with the rotor blade and the balance may be established before or after the front cross bar 112 is moved e.g. downwards again.

The device may now be moved downwards and upwards on the rotor blade, controlled by the hoisting means 123 and 125, while simultaneously the support and balancing means, e.g. 107, 119, 109, 121, 141 and 129, may be adjusted, controlled by control means, in order to achieve a suitable working position.

When the necessary work has been performed, the device 100 is brought to the level where it was transferred to the rotor blade, e.g. a level for example at or near the location usually referred to as "chord max", and/or the level where a minimum distance between the front edge of the rotor blade and the tower exists, and the operations described above are now performed in a reverse order, e.g. the rear adjustable support 111 is brought into contact with the tower, the front cross bar 112 is lifted, the wheels 119 and 141 is retracted from the rotor blade (not necessarily in that order), and the device is moved towards the tower and allowed to travel downwards.

Further, it is noted that the device 100 comprises a track 132, on which an object such as a robot, a tool, an apparatus, a gondola or a work platform 130 is supported in such a manner that the e.g. gondola can be located at preferably any position along the frame 102, e.g. as explained in connection with the previous embodiments, for example using e.g. an endless track. It is noted, though, that as shown in FIG. 8, the track may not be endless, since it may not be connected from for example the front cross bar 112 to the frame leg 106, meaning that it may be necessary to travel around the frame 102, if it is desired to move from a location on the front cross bar 112 to the frame leg 106. However, for practical purposes, such a track may be seen as being endless, since substantially all parts of a rotor blade can be attended to, which also applies to other embodiments described in this application. However, it is apparent that devices having a track for transporting a work platform, which track only corresponds to part of the circumference of a rotor blade, for example only one side, are possible.

Furthermore, it is noted that an object, e.g. a gondola or work platform may comprise more than one movable work platform, e.g. for example two work platforms that may be moved essentially independently on the track 132 on the frame 102. One of these may be a master gondola and the other may be a slave gondola, meaning that the device 100 may be controlled from the master gondola, for example as regards the movement up and down on the e.g. rotor blade, whereas this may not be possible from the slave gondola. Both of these gondolas may be controlled to be moved along the track 132, independent of each other. They may also both be controlled to be moved towards or away from the surface of the rotor blade, and they may possibly also be moved in other manners, for example moved an angle, e.g. rotated, etc. Hereby, it is made possible that work can be performed by two or more persons on different areas of e.g. the rotor blade, but at the substantially same level, whereby the work can be performed quicker and more efficiently than if the same number of persons were placed in one and the same gondola. According to a particular embodiment, a master and a slave gondola may be connected to each other, possibly in such a manner that they may be used as a single gondola or work platform. Such arrangements as described above with two or more platforms may also be used in connection with other embodiments described herein, and vice versa, features described in connection with gondolas and platforms described in other embodiments herein may also be used in connection with such a master/slave arrangement, including the use of control equipment, joysticks etc. that are easily handled, seating arrangements in the gondolas, screenings, means for containing equipment, tools etc, which may possibly be removable, etc. Similar applies when objects in the form of robots, tools, apparatuses etc. are used in connection with the device.

According to a further aspect of the invention, the device for enabling access to a structure such as a wind turbine rotor, wind turbine tower etc. may be provided with means for facilitating a dampening of the device of the device itself, but more importantly the structure, on which the device is used. Since the device may be used and operated at considerable heights, it is apparent that the structure itself, e.g. the wind turbine, and the device, for example the frame structure, a work platform, a gondola etc. will be affected by the environment, e.g. influenced by the wind, turbulences, etc. In order to counteract, e.g. neutralize such influences, the device according to any of the embodiments described herein may be equipped with means for effecting a dampening of the undesired influences. Such dampening means may be passive, but preferably or in addition to passive dampening means active dampening means may be used. In particular, the weight or mass of the device including work platform, gondola, personnel, tools, etc. may in this manner be used to dampen the movements of the structure itself, for example a rotor blade, in such a manner that even in windy conditions the structure, e.g. a rotor blade, will be stable and relatively immobile. Hereby, the working conditions including the security of the personnel are also improved considerably, and work may be performed in conditions where it previously has not been found possible to work in a secure manner.

Figure 9:
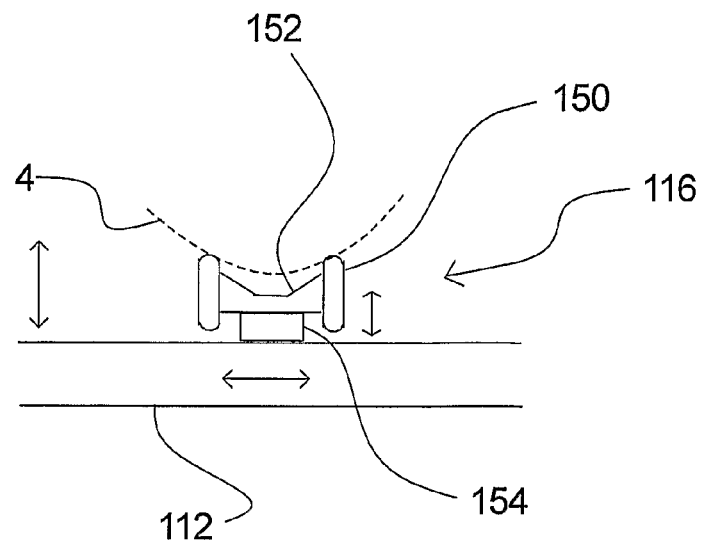
FIG. 9 shows in a schematic manner one of the guide and support arrangements comprising dampening means.
Figure 10:
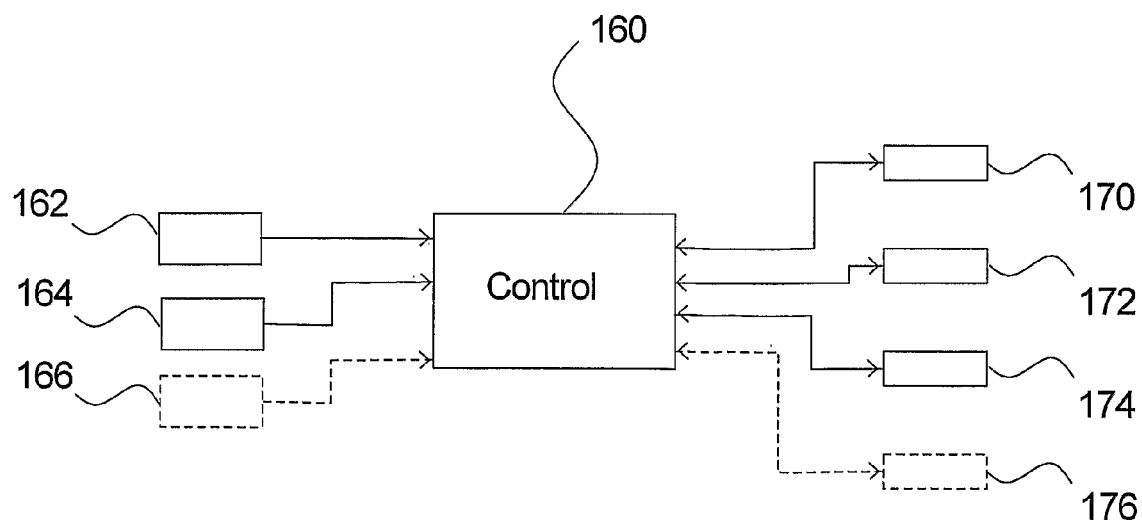
FIG. 10 shows an example of a control system for an active dampening system in accordance with a further aspect of the invention.

This further aspect is illustrated in FIGS. 9 and 10, where FIG. 9 in a schematic manner illustrates one of the guide and support arrangements, here the front guide and support arrangement 116 that supports the device against the front edge of the rotor blade 4, when the device is moved up and down and when the device is parked. It will be understood that what is described in the following with reference to a front guide and support arrangement 116 may also find use in connection with a rear guide and support arrangements.

The front guide and support arrangement 116 may comprise a pair of wheels 150, which are located on bearing means 152, which may be located on a carriage 154. As explained above, the front guide and support arrangement 116 may be displaced laterally along the front traverse 112, and this front traverse 112 may also be displaced in a direction perpendicular to the direction, in which the carriage 154 may be moved as also explained in connection with FIG. 7. Passive dampening means, such as for example spring means, may be used in the connections between e.g. the wheels 150, the bearing means 152, the carriage 154 and/or the front traverse 112 etc. in order to achieve a dampening of undesired influences. However, in addition or instead, active dampening means may be used, for example connected between these components. For example, active electric, electronic, hydraulic or pneumatic dampening means may be used, and/or the respective moveable elements may be controlled to counteract the undesired influences. This is illustrated in FIG. 10, showing a control system for performing an active dampening of the device. By means of such a system, the device including the frame parts, the work platform, the gondola, the tools, the personnel etc. may be controlled to move in a direction opposite the direction, in which the structure, for example the rotor blade, is being influenced to move, for example caused by the wind, whereby movements of e.g. the rotor blade are reduced considerably or possibly even completely avoided. Thus, it will be understood that the device may be controlled by the system to move in a counter-acting pattern, e.g. with the same frequency as the structure but in opposite directions and with an amplitude that corresponds to the amplitude of the structure, but taking into consideration the difference between the mass of the device and the mass of the structure. Thereby, the mass of the device may be used to control the movement of the mass of the structure.

It will be understood that active dampening may take place on one or both of the illustrated front and rear guide and support arrangements and that other support arrangements may be involved as well or instead of these.

Such a control system comprises control means 160, for example computerized control means that may be integrated with the general control system for the device. The control means 160 may receive input from one or more sensors, e.g. 162, 164, 166, for example accelerometers, anemometers etc, and on the basis of such input signals one or more active dampening means, e.g. 170, 172, 174, 176 may be controlled. Further, the control means 160 may receive input signals, for example feedback signals, as well from the active dampening means, e.g. 170, 172, 174, 176. As mentioned above, the active dampening means may for example be electric, electronic, pneumatically, hydraulically, electric driven means, which will be apparent to the skilled person. Further, a wide variety of such active dampening means may be used, which will be apparent for a person skilled in the art.

As explained above, such active dampening means may be used in connection with the front and rear guide and support arrangements, which support the device against the front and rear edges of the rotor blade, when the device moves up and down the rotor blade and when the device is parked. It is obvious, though, that such dampening means may also be used when the device is used in connection with other structures, and further, the dampening means may be used in connection with other elements than the front and rear guide and support arrangements.

It is further apparent that this embodiment of the invention may be used as explained in connection with the other embodiments for a wide variety of applications and that the features that have been described in connection with these other embodiments and as characterized in the claims, also may find use in connection with this further aspect of the invention.

A further embodiment of a device in accordance with the invention for enabling access to a structure above ground level such as a rotor blade of a wind turbine will be explained with reference to FIGS. 11 to 26.

Figure 11:
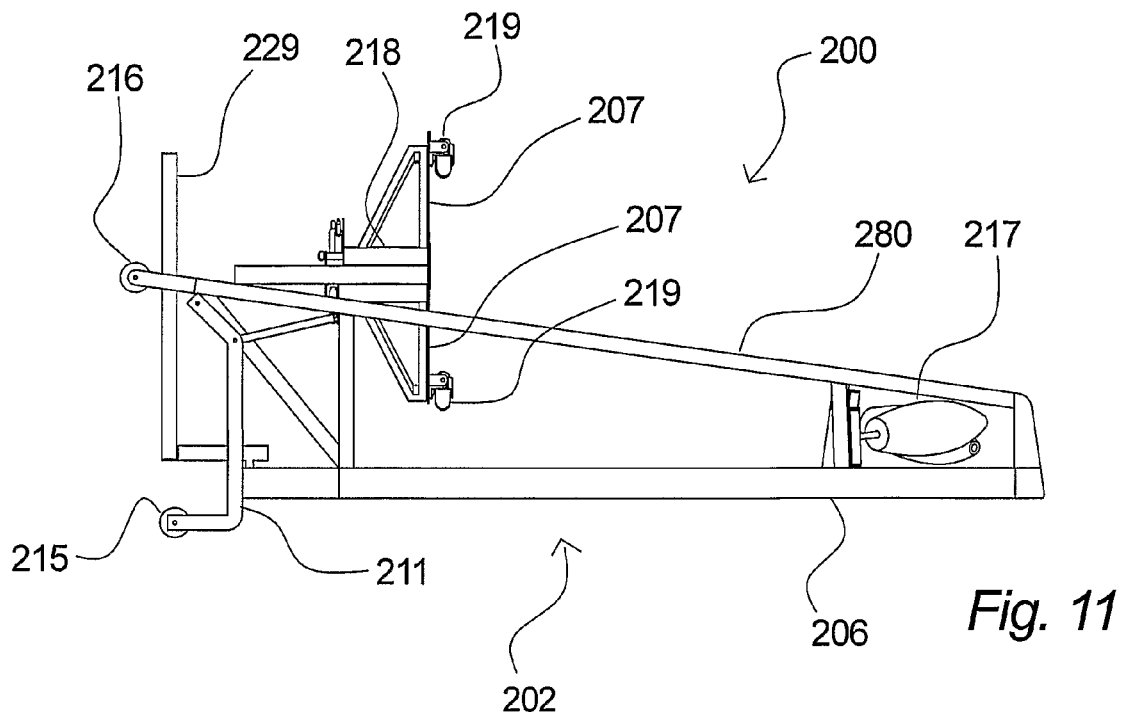
FIG. 11 shows a further embodiment of a device according to the invention seen in a side view.
Figure 12:
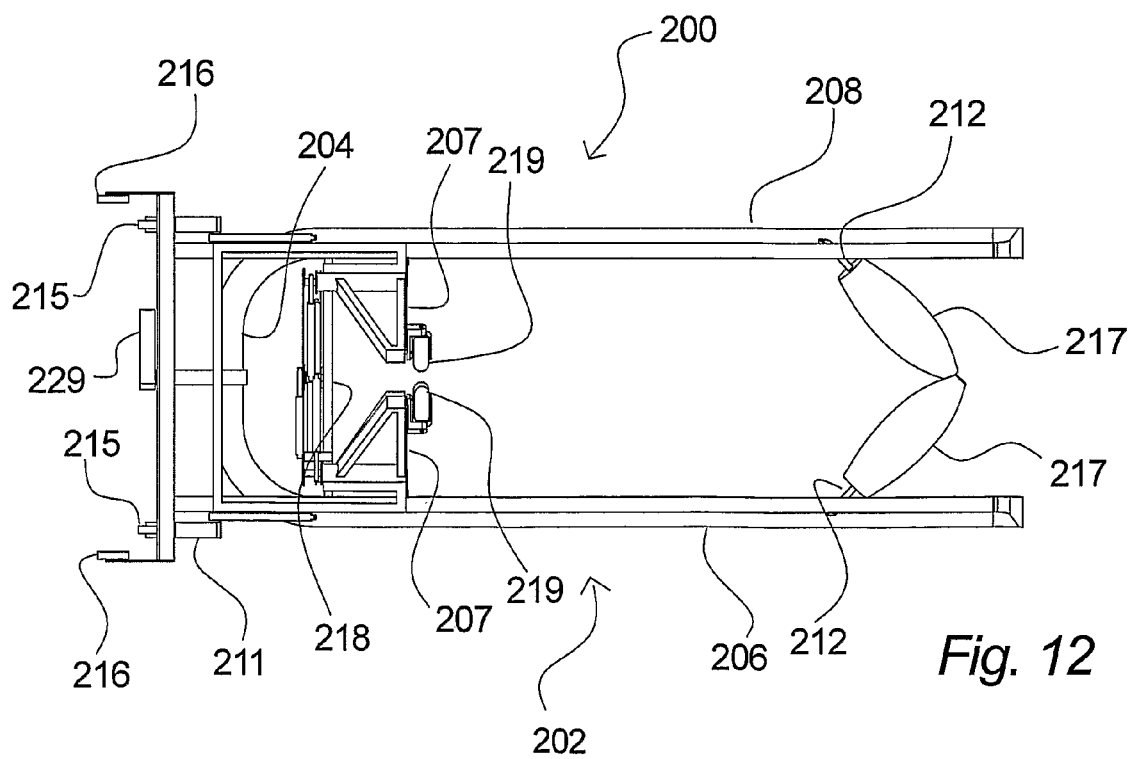
FIG. 12 shows the device shown in FIG. 11 from above.

This device 200 is shown in FIG. 11 seen from the side and it is shown in FIG. 12 seen from above. It is noted that equipment such as one or two work platforms, robots, tools, etc. and hoisting means are not shown in these and the following figures, which show basic elements of the frame 202 in a schematic manner. Thus, it will also be understood that electric elements, electronic control devices etc. are not shown in these figures. Furthermore, it is noted that the device 200 comprises a track (not shown) corresponding to the track described in connection with the device 100 described above. This track is designed for carrying one or more objects, such as one or more work platforms, robots, tools, etc.

The frame 202 has an essential U-shaped form with two frame legs 206 and 208, connected at one end by a rear support structure 204. Preferably, the abovementioned track may form part of the frame legs and the rear support structure. Furthermore, the frame 202 has a strengthening lattice structure 208 placed above the frame legs. The device 200 is designed to perform essentially as the embodiment shown in FIG. 8 and as explained in connection with FIGS. 3-6, e.g. for being hoisted up along a wind turbine tower while being supported to the tower by means of rollers or wheels 216. Furthermore, the device 200 comprises further support wheels 215 or the like, the function of which will be explained later on.

The device 200 comprises a front guide and support arrangement comprising a pair of elongated rollers 217 that preferably may be shaped as shown in FIGS. 11 and 12, e.g. with a diameter being reduced towards the ends, and being designed with a surface having a suitable friction characteristic, e.g. a small friction, whereby the device may expediently be hoisted up and down a rotor blade, while the rollers 217 roll up and down the front edge of the rotor blade, cf. e.g. FIG. 7. The rollers 217 are carried by front supports 212, that are carried by the frame legs 206 and 208. It will thus be understood that the front guide and support arrangement is not designed for being moved in the direction of the frame legs, but as it will be explained in the following, the rollers 217 may be pivoted in relation to the frame legs 206 and 208.

The device 200 further comprises a rear guide and support arrangement 218 for supporting the device in relation to the rear edge of the rotor blade. In the shown embodiment, this comprises four support wheels 219 or the like, but it will be understood that two may be used, one placed at each side of the rotor blade. Each of these support wheels 219 are supported by wheel carriages 207 that are tiltable in relation to the vertical plane of the device, controlled by e.g. control arms 210, whereby the position of the wheels 210 can be selectively adjusted, e.g. in order to accommodate a rotor blade. Further, the rear guide and support arrangement 218 can be displaced in the longitudinal direction of the device, which will be exemplified in the following. Finally, the device comprises a line guiding arm 229, which is located at the rear of the frame 202, e.g. at the rear support structure 204. A hoisting means (not shown), for example corresponding to the hoisting means 120, 122 or 124 shown in FIGS. 1 and 2, is located at the upper end of the line guiding arm 229. A further hoisting means is located at the frame leg 208, possibly in such a manner that its position in the longitudinal direction of the frame leg 208 can be adjusted. The device 200 is designed for being lifted and lowered using only these two hoisting means, but it will be understood that more than two may be used, if found expedient.

Figure 13A:
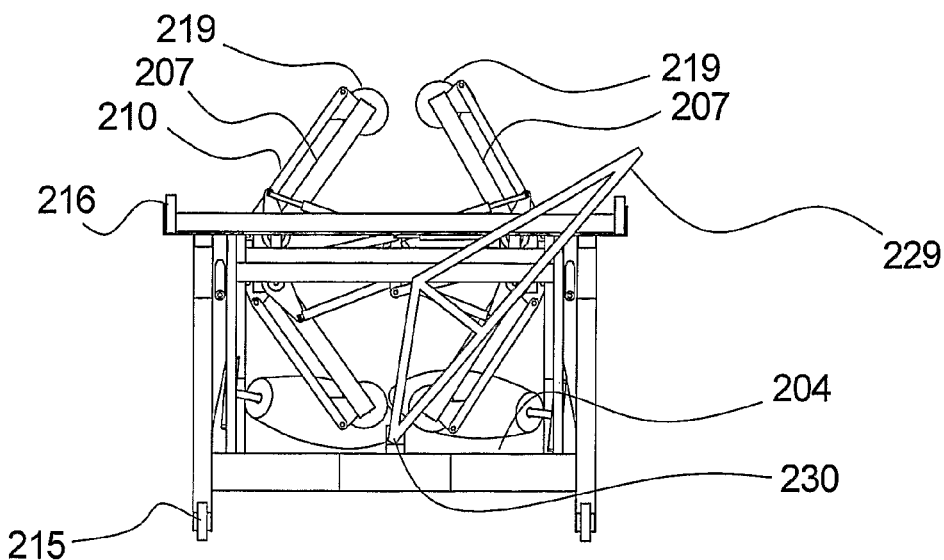
FIGS. 13*a-c* show the device seen from the rear end with different positions of a line guiding arm.
Figure 13B:
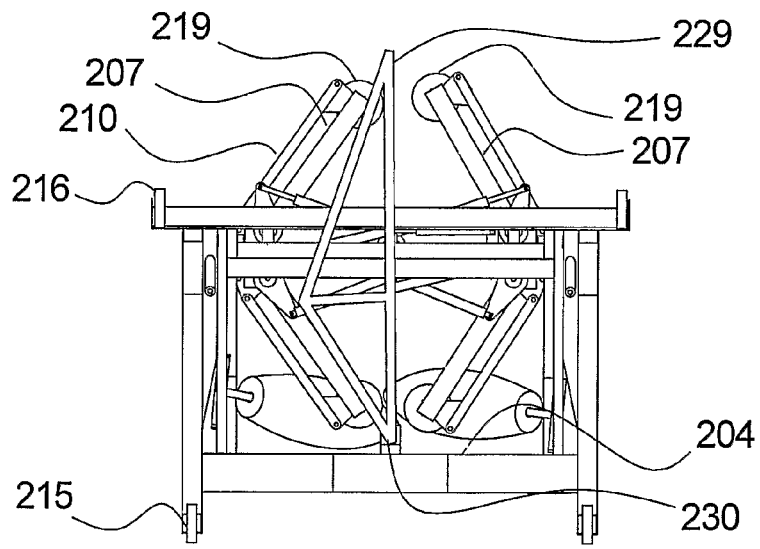
Figure 13C:
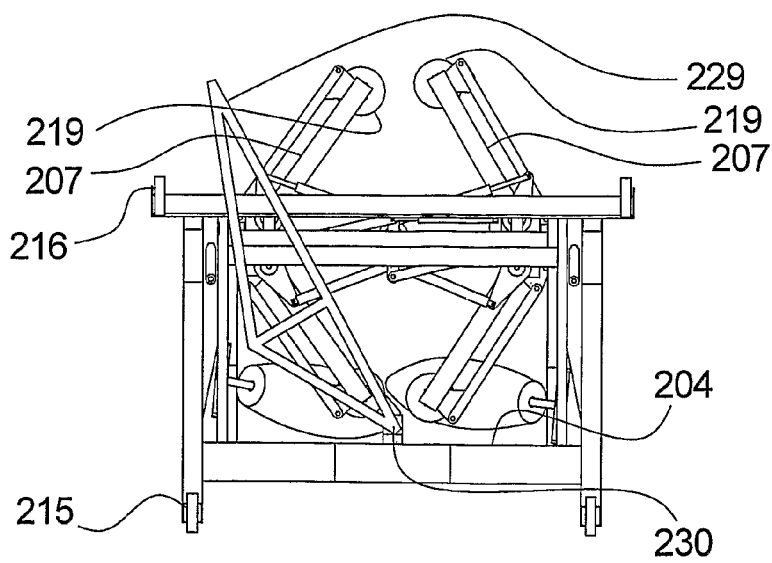

In FIGS. 13*a*-13*c* the device 200 is shown from the rear end in order to illustrate the function of the line guiding arm 229, which as explained above will be equipped with a hoisting means near the top or at least a means for directing the hoisting line, such as for example a pulley. As shown, the line guiding arm 229 can be adjusted in the lateral direction, i.e. by rotating it in relation to its bearing 230, whereby it may be placed in positions from the right as shown in FIG. 13*a* via a middle position as shown in FIG. 13*b* to the far left as shown in FIG. 13*c*. As explained in connection with previous embodiments, this is controlled on the basis of parameters such as the load on the individual support wheels 219, input from a gyrometer, input from other sensors etc., whereby the device can be balanced and whereby for example the actual position of a work platform can be compensated for.

It will be understood that instead of using a pivotable line guiding arm 229, other means may be used for adjusting the position of the hoisting line. For example, the hoisting means connected to the rear end of the device 200 may be connected to a horizontal beam or the like (not shown), which extends across the frame 202, and which has controllable means, e.g. an electric or electronic actuator for adjusting the position of the hoisting means and thus also he hoisting line in a range corresponding to the width of the frame 202 or preferably more, corresponding to the effective control range achieved by the line guiding arm 229, cf. FIG. 13*a*-13*c*. Other means may be used as well, which will be apparent to a skilled person.

Figure 14:
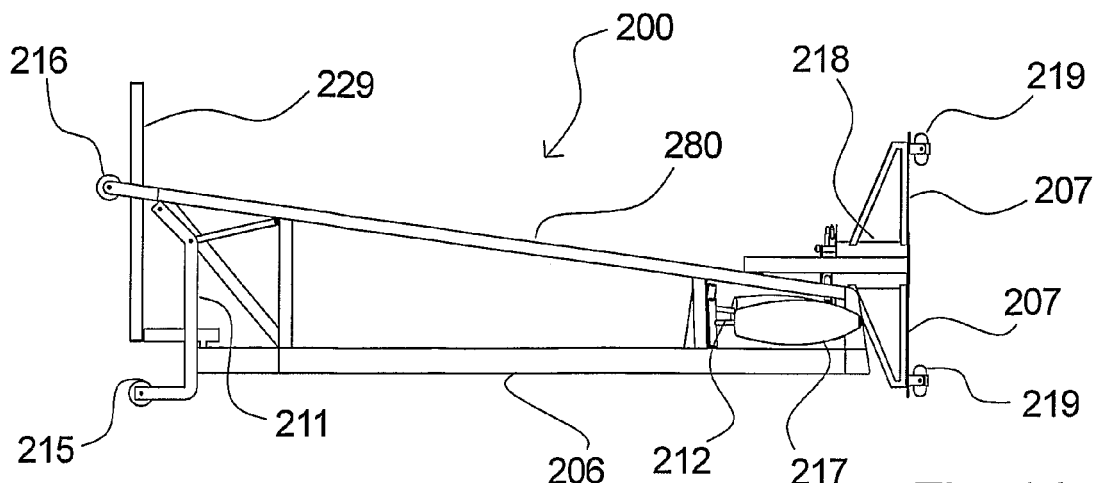
FIGS. 14-16 show the device with the frame opened in order to receive a rotor blade and seen from the side, from above and from the front end, respectively.
Figure 15:
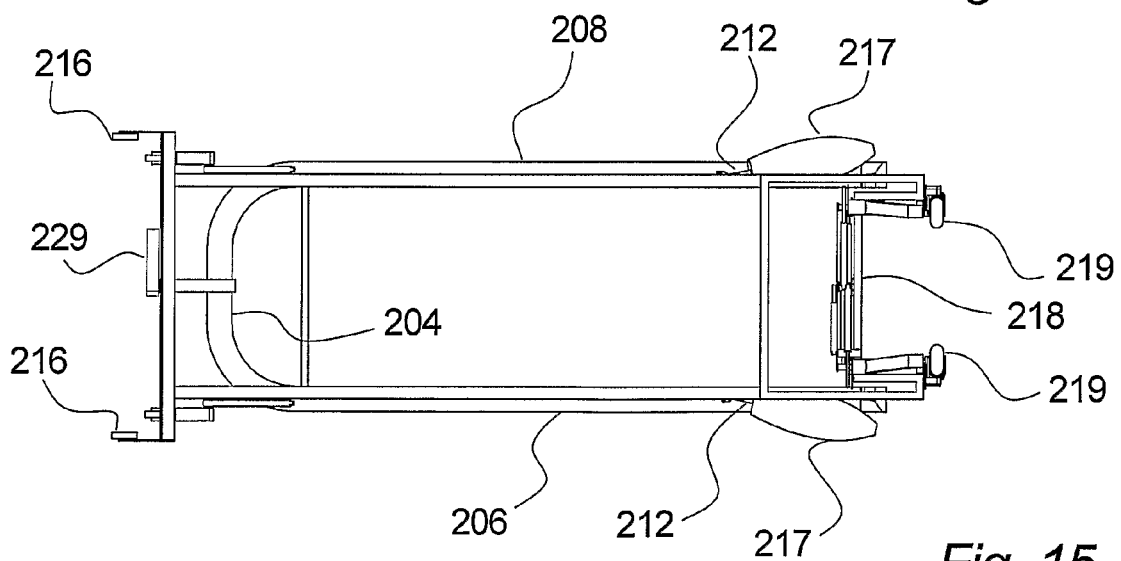
Figure 16:
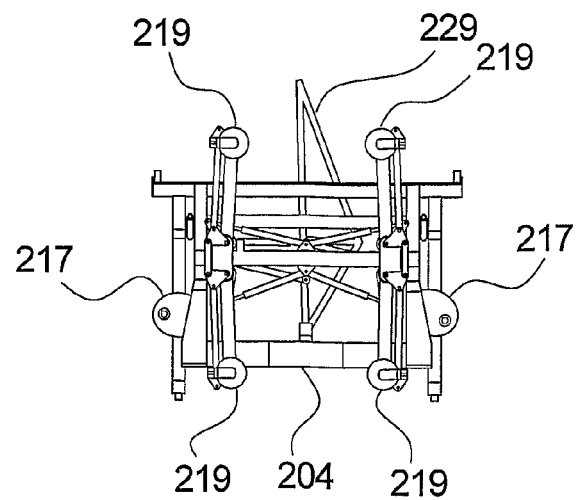

The function of the device 200 will now be explained with reference to FIGS. 14, 15, and 16, which show the device in a position, where the rollers 217 of the front guide and support arrangement, carried by the front supports 212, has been turned outwards as shown in FIG. 15, whereby the frame 202 is opened in order to receive a rotor blade. This may for example take place, when the device is being hoisted upwards along the tower. Further, the rear guide and support arrangement 218 has been moved towards the open end of the frame, and as it can be seen in FIG. 16, the support wheels 219 has been moved to an outer position, whereby the rear edge of the rotor blade is free to enter the inner space of the frame. When this happens, it will be detected by means of sensors, for example optical sensors placed at the open end of the frame 202 and/or at the rear guide and support arrangement 218, and the support wheels 219 will be moved towards the surface of the rotor blade, until they contact the surface of the rotor blade at a predetermined region near the edge. As the rotor blade moves into the open frame, as the device is hoisted further upwards, the rear guide and support arrangement 218 is moved towards the tower, controlled by the control system on the basis of sensor inputs, in order to have the support wheels bearing against the rotor blade in the predetermined region near the rear edge. It will later be described in detail how the device is moved towards the rotor blade and how the device is closed around the rotor blade, e.g. when the front support rollers 217 are returned to the closed position, in which the device can be hoisted up and down the rotor blade by the hoisting means, while the rear support wheels 219 and the front support rollers 217 are supporting and guiding the device against the rotor blade.

Figure 17:
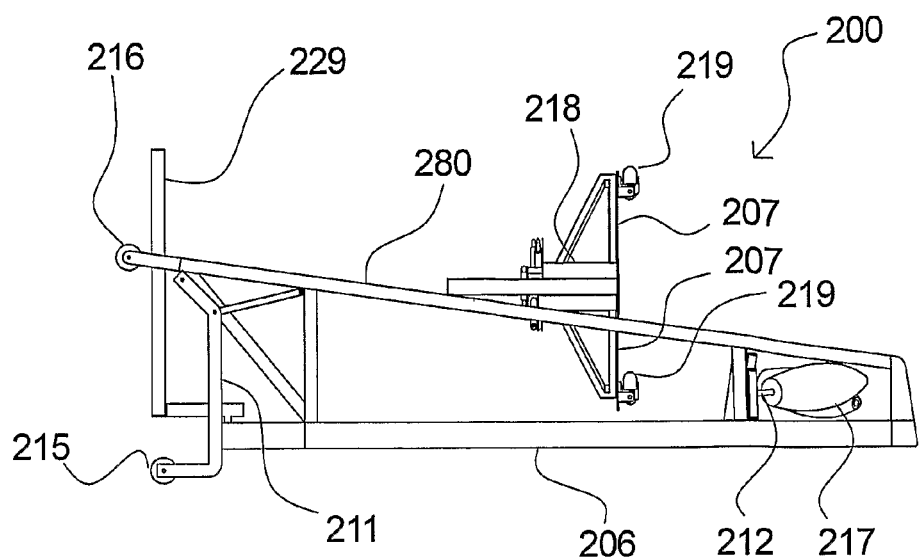
FIGS. 17-19 show a device in views corresponding to FIGS. 14-16, but showing a rear guide and support arrangement in a position corresponding to a relatively small width of the rotor blade.
Figure 18:
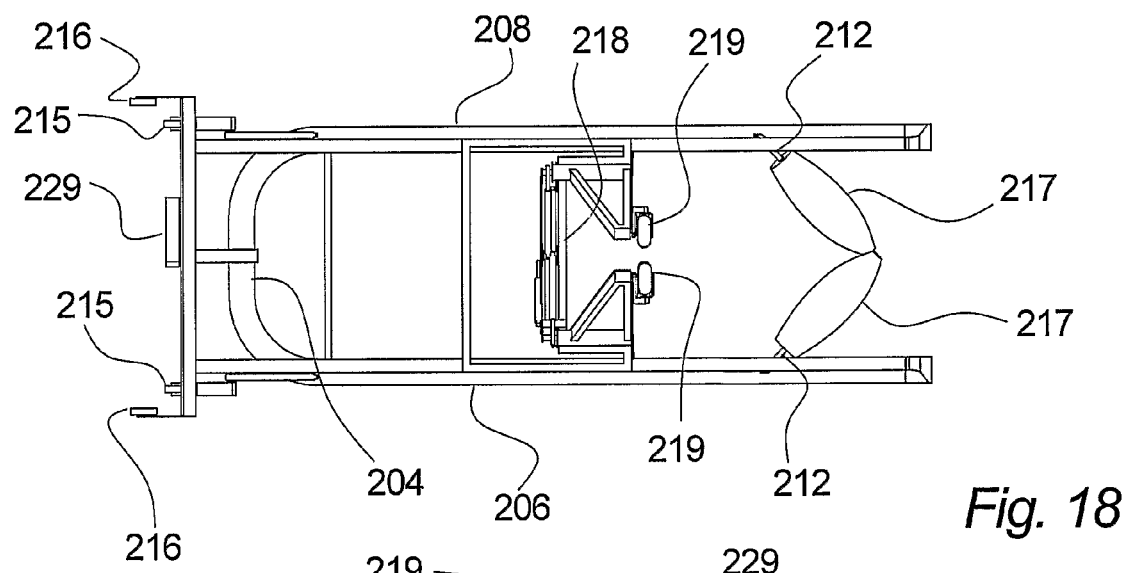
Figure 19:
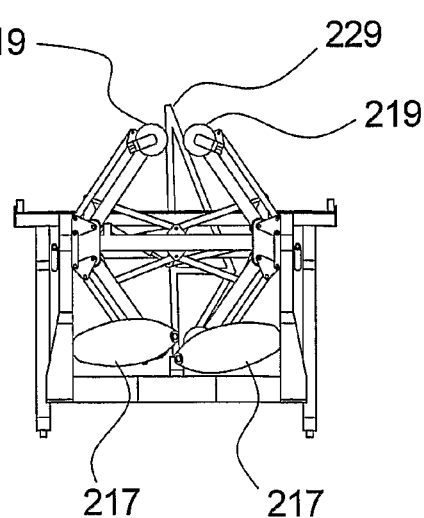

In this operative mode, the rear guide and support arrangement 218 will be moved back and forth in the frame in correspondence with the varying width of the rotor blade, which is illustrated in FIGS. 17, 18 and 19, where the rear guide and support arrangement 218 is in a position corresponding to a relatively small width of the rotor blade. It will be understood that during these movements, the balance of the device may be adjusted by means of the line guiding arm 229, in correspondence with the actual position of the device, the actual position of the work load, e.g. the one or two work platforms, gondolas etc., the wind load etc.

The function of the further support wheels 215 will now be described with reference to FIGS. 20-24b, where FIGS. 20-23 shows a device 200, while it is being hoisted upwards along a wind turbine tower 2. The wind turbine tower may not have a completely smooth surface and furthermore, certain equipment may be placed at the surface of the tower, whereby the advance of the device maybe prohibited. For example, the tower may be modular and be connected at outwards extending flanges or the like. Further, equipment such as cellular communication antennas or the like may be placed along the tower. Such obstacles are indicated with the reference number 20 in the figures.

Figure 20:
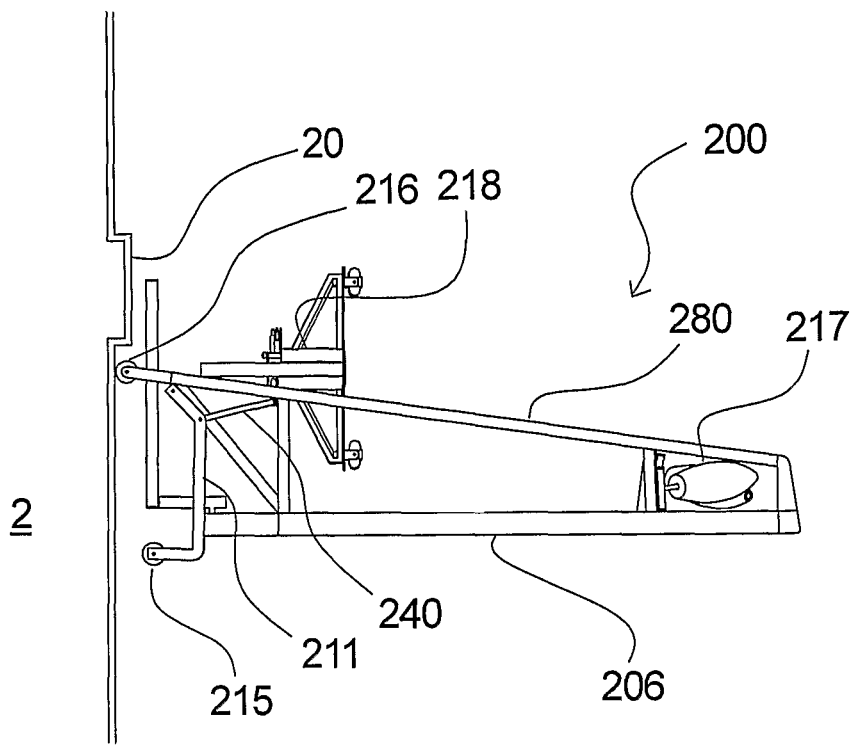
FIGS. 20-22 illustrate the function of a further support wheel arrangement for a device being hoisted upwards along a wind turbine tower.
Figure 21:
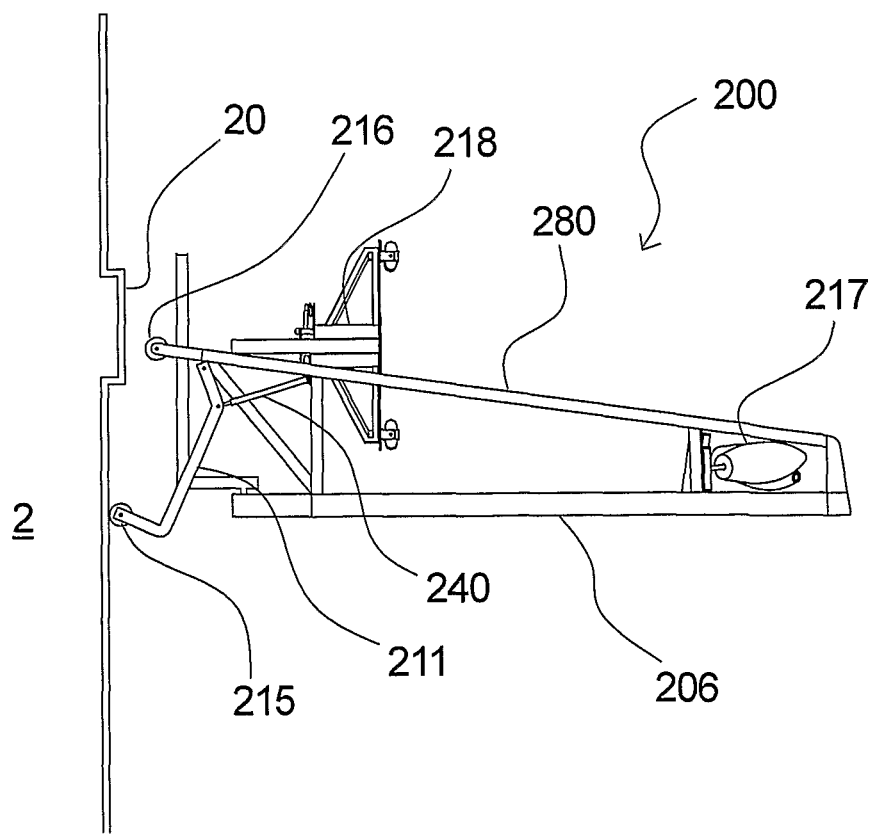
Figure 22:
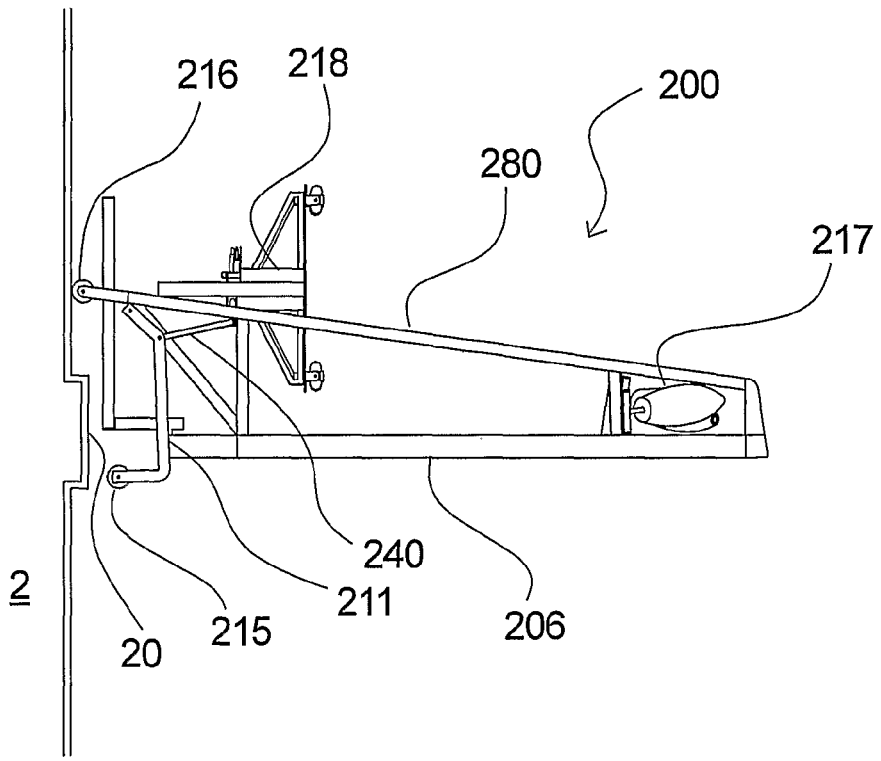

In FIG. 20, the support wheels 216 have reached such an obstacle, which is detected by sensors. As shown in FIG. 21, the further support wheels 215, which are carried by support arms 211, activated by actuators 240, are now pushed towards the tower, whereby the device is displaced a distance from the tower, sufficient for the support wheels 216 to pass the obstacle. When the further support wheels 215 reach the obstacle 20, the further support wheels 215 are retracted again, allowing the support wheels 216 to take over again as shown in FIG. 22. It will be understood that this arrangement requires that the length of the support arms 211 exceeds the length of the obstacles. When moving downwards the tower, this arrangement will operate in a similar manner, which will be apparent to a skilled person.

Figure 23:
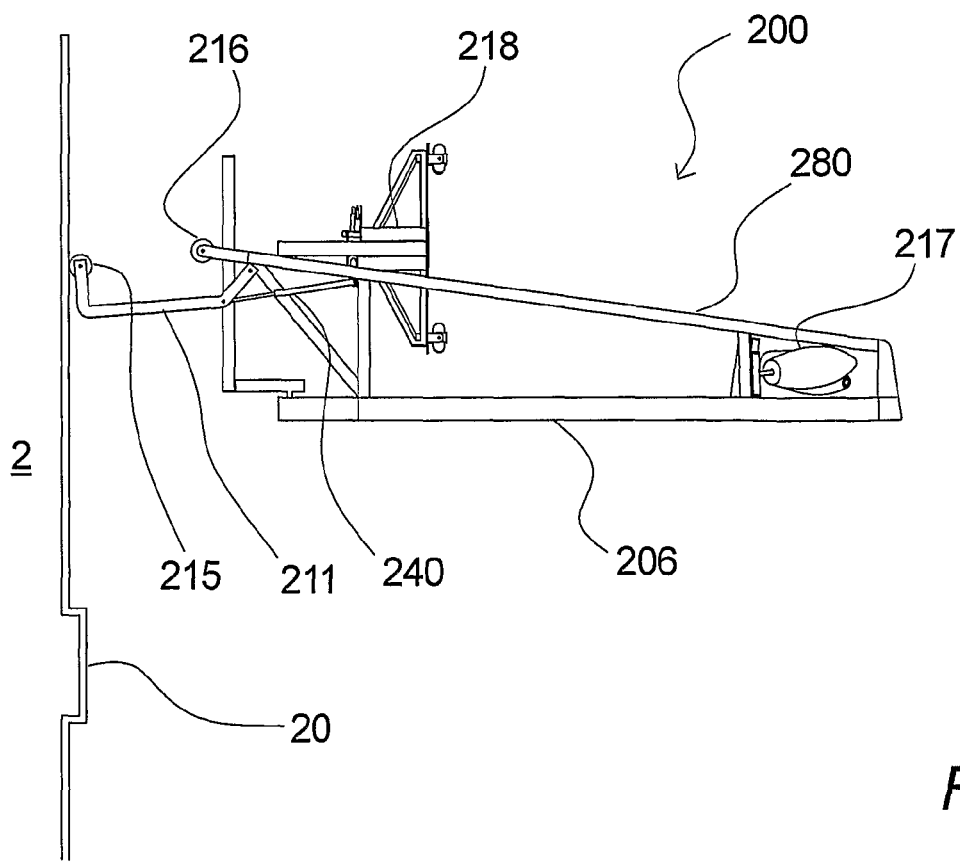
FIG. 23 shows in a corresponding view the use of the further support wheel arrangement for displacing the device away from the tower, FIGS. 24*a,b* show the use of the further support wheel arrangement for adjusting the position of the device, seen in a side view and from above, respectively, FIGS. 25*a,b* show a device seen from the front end, illustrating the different angular positions of the support wheel arrangements, when the device is moving upwards and downwards, respectively, and FIG. 26 show a work platform or gondola according to a still further embodiment.

The further support wheels 215 may have a further function as illustrated in FIG. 23, where the arrangement comprising the support arms 211 and the actuators 240 are extended fully in order to achieve that the device can be transferred to the rotor blade, cf. FIG. 5. Thus, this arrangement may be used instead of an adjustable support 111 as shown in FIG. 8.

Figure 24A:
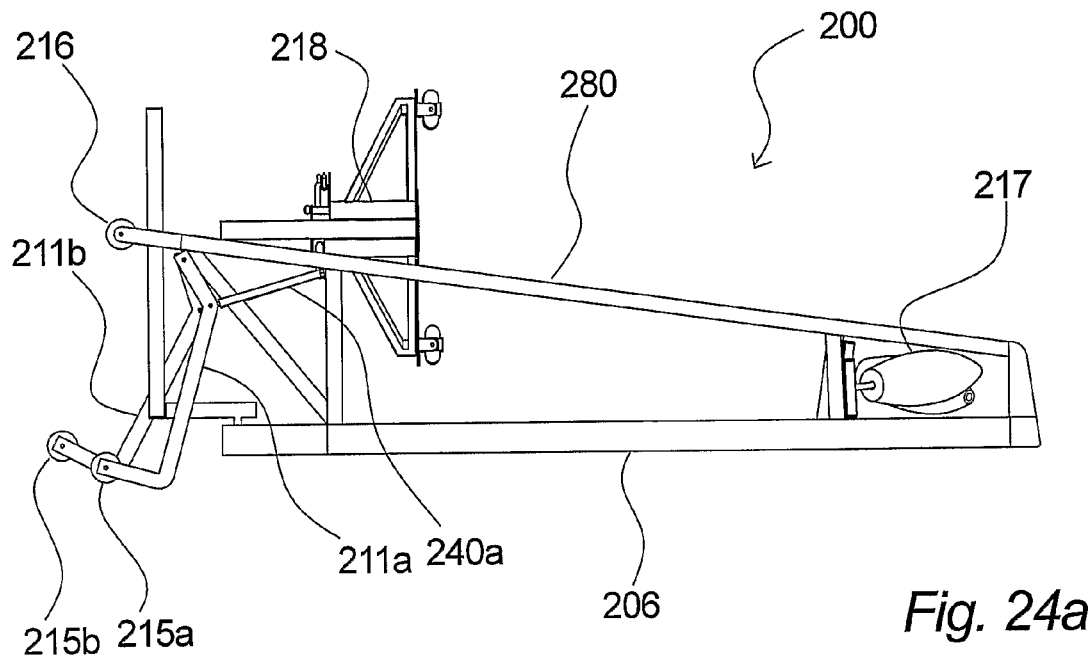
Figure 24B:
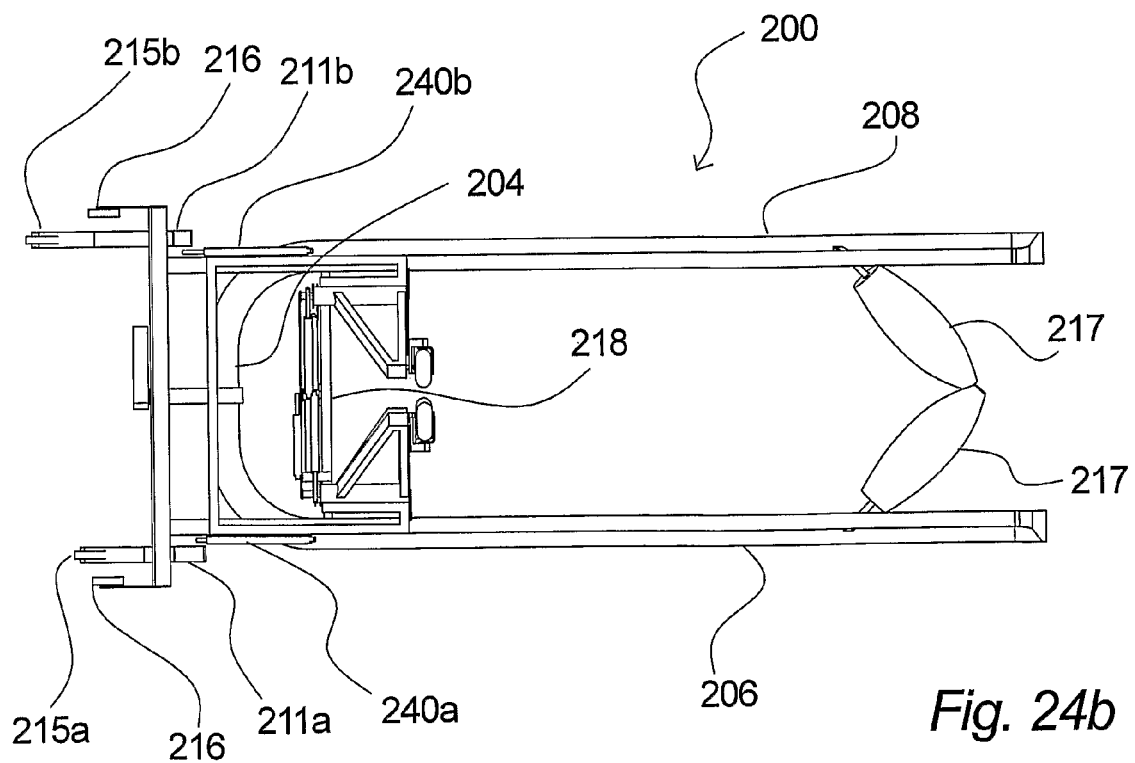

A further use of the further support wheel arrangement 215 is illustrated in FIGS. 24a and 24b, showing the device seen from the side and from above, respectively. When at least two further support wheels 215, e.g. 215a and 215b, are used, and when these are individually adjustable, as shown by the arms 211a and 211b and the actuators 240a and 240b, this may be used for controlling the angular position of the device in relation to the tower, which for example may be used in windy conditions to "catch" the rotor blade, when the device is being hoisted up along the wind turbine tower.

It will be understood that a support wheel arrangement and/or a further support wheel arrangement comprising more than two wheels may be used, for example in order to increase stability. Thus, this or these wheel arrangements may extend along a larger part of the perimeter of the wind turbine tower.

Figure 25A:
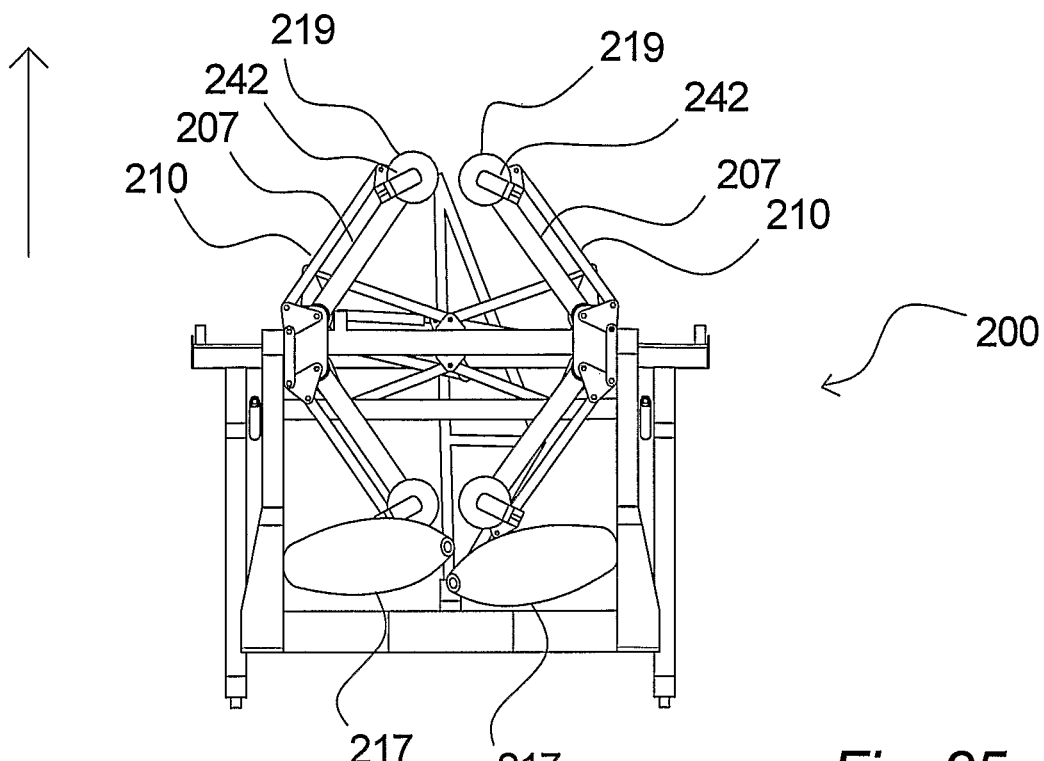
Figure 25B:
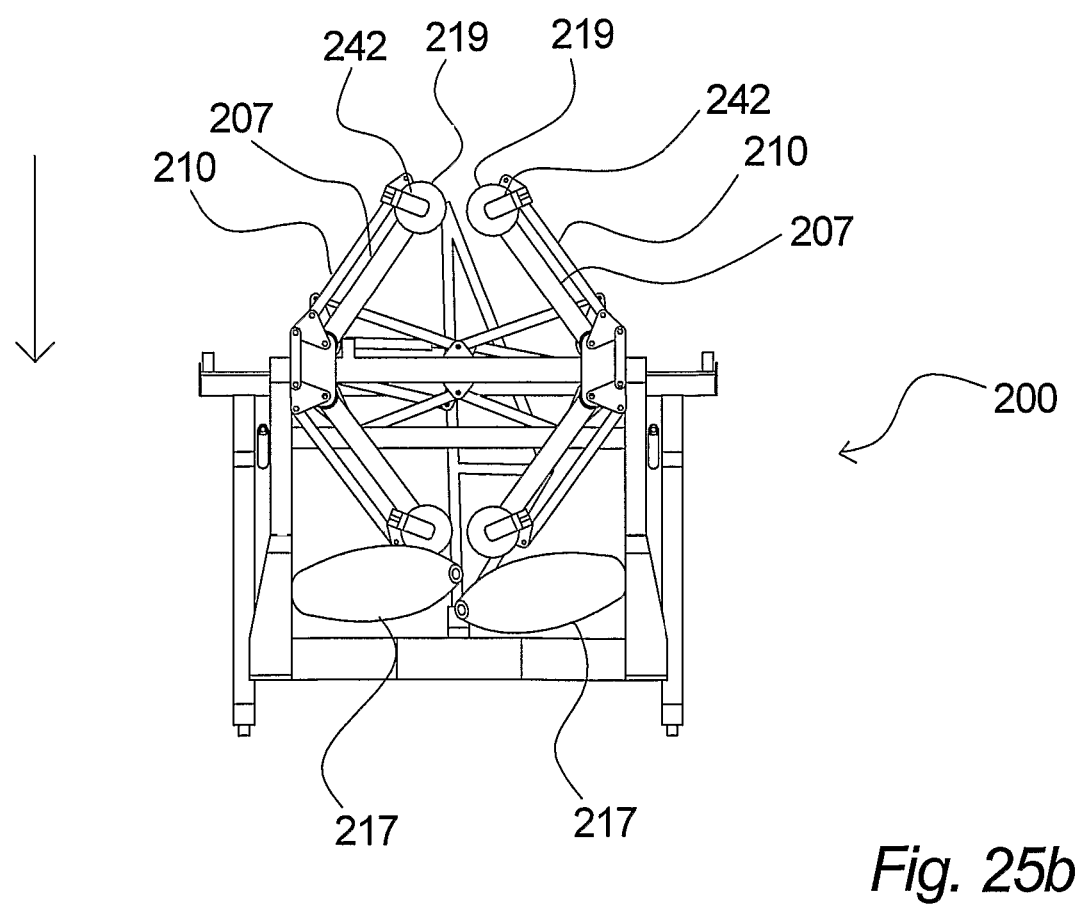

A further advantageous embodiment will now be explained with reference to FIGS. 25a and 25b, which show a device according to the invention seen from the front end, i.e. towards the tower. It will be understood that the device is moving up a rotor blade (not shown) in FIG. 25a and down a rotor blade as shown in FIG. 25b. In order to enhance stability, the support wheels 219 are arranged on short forks 242. These forks 242 are tiltable, controlled by e.g. control arms 210, in order to shift from one position as shown in FIG. 25a when moving upwards to another position as shown in FIG. 25b when moving downwards. Thus applies for the four support wheels 219 shown in FIGS. 25a and 25b, even though only the upper wheels have been referred to. In this manner it is achieved that the actual point of contact between the wheel and the surface of the rotor blade always will be lagging, i.e. placed behind the position pointed at by the fork 242, whereby increased stability is achieved which will be apparent to a skilled person. Furthermore, it is noted that this is achieved while maintaining the position of the centre of the wheels 219 unchanged.

Figure 26:
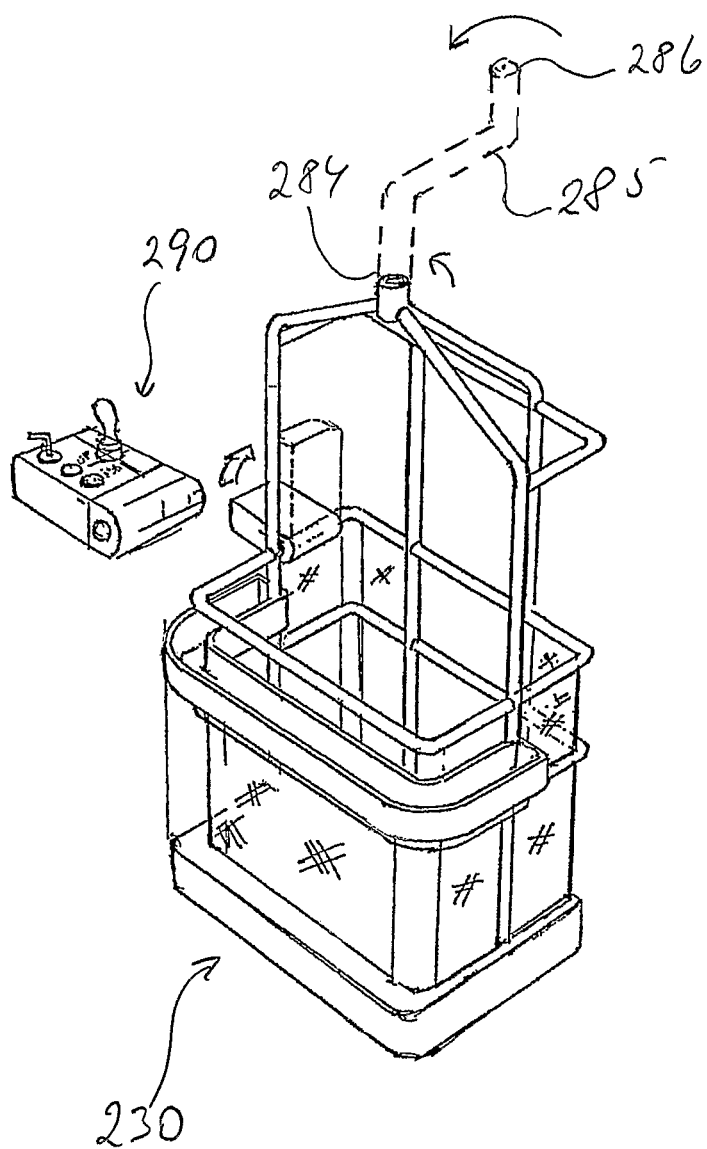

A further embodiment of the invention will be explained with reference to FIG. 26, which shows a gondola or work platform 230 for use in connection with the device 200, e.g. for being connected to the track on the frame 202. The gondola may be formed as an open cage of aluminium tubes, possibly with fenders for preventing that the gondola damages the windmill blade being inspected, serviced or repaired, etc.

The cage can accommodate one, two or even more individuals. The gondola also comprises a control panel 290 which allows the individual (s) using the gondola to move the gondola around the windmill blade and lift and/or lower the gondola relative to the blade. The up and down movements of the gondola can for example be provided by use of a Joystick. Further facilities such as rooms for repair equipment etc. can also be provided. Furthermore, as shown with slashed lines, the gondola 230 can be provided with an eccentric suspension 285, e.g. an S-shaped suspension, which provides the possibility that the position of the gondola may be adjusted when the suspension is rotated. It will be understood that the suspension 285 can be rotated at the connection 284 as well as at the connection 286, which for example is connected to the track of the frame 202 or the frame 102 of the embodiment shown in FIGS. 1 and 2. The rotation can be controlled for example by the control panel 290. This embodiment is of particular importance, when a frame is used, where the track does not extend along a full perimeter of the rotor blade, cf. for example FIG. 12, from which it will be understood that the front edge of the rotor blade may not be within reach, when a platform or gondola is moving along e.g. the frame leg 206. Here, the user may activate the S-shaped suspension 285, whereby the gondola 230 can be brought closer to the rotor blade, corresponding maximally to the length of the horizontal part of the S-shaped suspension 285. It will be apparent to a skilled person that the suspension can be designed in various other manners than the one shown in FIG. 26. In essence, a horizontal movement of the gondola 230 is achieved. Furthermore, it will be understood that an object in general being supported by the device 200 or 100 can be operated corresponding to, what has been explained above for the gondola 230.

Furthermore, it is noted that the functioning of the devices 200 and 100 have primarily been explained in connection with one or more work platform, gondolas or the like, where these have been used by one or more workers and controlled by these. However, it will be understood that the control can also be performed at e.g. ground level and that e.g. a person in a master platform may control the operation of a slave platform or a slave unit that may for example perform a job in a more or less automated manner. Further, it will be understood that the device 100 or 200 may perform in a automated or semi-automated manner, for example without any persons situated in or at the device. Thus, the one or more objects carried by the device in its track may thus be operative units, designed for performing a work operation, possibly controlled from ground level and controlled by a control system, which receives input from e.g. sensors, vision systems, etc. which will be apparent for a person skilled within the field of robotics, automation etc.

Furthermore, it is noted that the device described above in addition to hoisting means etc. comprise a number of actuators, motors, etc. and that these may be designed in numerous manners and in accordance with the practice within the relevant field. Thus, these may be designed as pneumatically or hydraulically driven means and further they may be designed as electric/electronically driven means, which will be apparent to a skilled person.

The invention claimed is:

1. A device for enabling access to a rotor blade of a wind turbine by lowering and/or lifting the device in relation to the wind turbine, the device comprising:
   a generally u-shaped frame structure;
   a rotor blade support for supporting the device in relation to said rotor blade;
   a hoist for lowering or lifting the device in relation to the wind turbine; and
   a movable object that is movable in relation to the generally u-shaped frame structure and carried by said generally u-shaped frame structure;
   wherein at least part of the generally u-shaped frame structure comprises a track portion, the track portion being adapted to guide said, in relation to the track portion, movable object along the track portion;
   wherein said rotor blade support is adapted for supporting the device in relation to a front edge and a rear edge of said rotor blade and is configured for positioning said device in relation to the rotor blade; and
   wherein said rotor blade support is further configured for facilitating a movement of said device substantially in the longitudinal direction of said rotor blade and configured for adapting to the actual size or shape of the rotor blade during the movement of the device along the rotor blade.

2. The device according to claim 1, wherein said rotor blade support is further adapted for supporting the device in relation to a side part of said rotor blade of a wind turbine.

3. The device according to claim 2, wherein said rotor blade support, which is adapted for supporting the device in relation to a front and a rear edge of said rotor blade of a wind turbine, is displaceable in the lateral direction or the longitudinal direction of the device.

4. The device according to claim 1, wherein said rotor blade support comprises a rear guide and support arrangement comprising a plurality of wheels or the like, at least one of which is adapted for supporting against either side of the rotor blade.

5. The device according to claim 4, wherein said plurality of wheels or the like are carried by wheel carriages, which facilitate a movement in the lateral direction of the device towards said rotor blade.

6. The device according to claim 4, wherein said rear guide and support arrangement is movable in the longitudinal direction of the device.

7. The device according to claim 1, wherein said rotor blade support comprises a guide and support arrangement.

8. The device according to claim 7, wherein said front guide and support arrangement comprises a plurality of rollers or the like, which are pivotable in relation to the generally u-shaped frame structure.

9. The device according to claim 7, wherein said front guide and support arrangement comprises a plurality of rollers or the like, which are designed with a cylindrical middle part and end parts with the diameter being reduced towards the ends.

10. The device according to claim 1, further comprising a tower support for supporting the device in relation to a wind turbine tower.

11. The device according to claim 10, wherein said tower support is configured for displacing the device in relation to said wind turbine tower when the device is transferred to or removed from said rotor blade of a wind turbine.

12. The device according to claim 10, wherein said tower support is configured for adjusting the position and/or the angle of the device in relation to said wind turbine tower.

13. The device according to claim 10, wherein said tower support is configured for supporting said device against said wind turbine tower at least at two points spaced apart in the vertical direction, and wherein at least one of the at least said two points is adjustable in relation to the surface of the wind turbine tower.

14. The device according to claim 1, wherein the object comprises a work platform adapted to carry one or more individuals.

15. The device according to claim 14, wherein the object comprises a tool, a robot, or an apparatus for performing an operation on the rotor blade in a substantially automated manner.

16. The device according to claim 1, wherein the object comprises two or more work platforms, gondolas, tools, robots, or apparatuses.

17. The device according to claim 16, wherein said two or more work platforms, gondolas, tools, robots, or apparatuses are independently movable with respect to one another.

18. The device according to claim 16, wherein one of said two or more work platforms, gondolas, tools, robots, or apparatuses is configured as a master unit and the other(s) is/are configured as slave unit(s).

19. The device according to claim 16, wherein said two or more work platforms, gondolas, tools, robots, or apparatuses are configured for being connected together to form a single gondola, work platform, tool, robot, or apparatus.

20. The device according to claim 1, wherein the object comprises seating for one or more individuals.

21. The device according to claim 1, wherein the object comprises a controller for controlling the position of the object in relation to the track portion.

22. The device according to claim 1, wherein the generally u-shaped frame structure forms an essentially elongated structure.

23. The device according to claim 1, wherein said hoist comprises a powering mechanism such as an electric, electronic, hydraulic or pneumatic motor for lifting, lowering or displacing the device in relation to the structure.

24. The device according to claim 23, further comprising a controller for controlling the hoist.

25. The device according to claim 1, wherein the device is adapted to assist individuals in performing inspection, work, repair, surface treatment etc, on a rotor blade of a wind turbine.

26. The device according to claim 23, wherein said hoist is connected to one or more lines, wires or the like.

27. The device according to claim 23, wherein said hoist is adapted to change the direction of movement of one or more of the lines or wires for lifting or lowering the device, thereby altering the balance of the device.

28. The device according to claim 1, further comprising a dampener for performing a dampening action of the device in relation to said wind turbine rotor blade.

29. The device according to claim 28, wherein said dampener is a passive dampener.

30. The device according to claim 28, wherein said dampener is an active dampener.

31. The device according to claim 30, wherein said active dampener is controlled by a controller.

32. The device according to claim 30, wherein said active dampener is controlled on the basis of input signals from a sensor comprising wind sensors and accelerometers.

33. The device according to claim 1, wherein said device comprises a control system for automatically controlling actuators and hoist on the basis of control input from sensors including gyroscopic sensor(s), pressure sensor(s), optical sensor(s), and strain gauge sensor(s).

34. The device according to claim 1, wherein said device is adapted for being permanently fixed at said wind turbine at a nacelle of said wind turbine, and adapted for being operated by lowering and transferring the device to a rotor blade.

35. A method of enabling access to a rotor blade of a wind turbine, comprising:
placing a device comprising a generally u-shaped frame structure, a rotor blade support for supporting the device in relation to said rotor blade, and a hoist for lowering or lifting the device in relation to the wind turbine near said wind turbine essentially at ground or sea level;
lifting the device in relation to said wind turbine by using at least one line or wire connected to said wind turbine;
positioning the rotor blade inside the generally u-shaped frame structure of the device;
when the device reaches a first height level, engaging the rotor blade with the rotor blade support at a first edge of the rotor blade, wherein the rotor blade support is movable in relation to said device;
when the device reaches a second height level higher than the first height level, engaging the rotor blade with the rotor blade support at the first edge and a second edge of the rotor blade; and
lifting or lowering the device in relation to the rotor blade while the rotor blade is engaged by the rotor blade support at both the first edge and the second edge of the rotor blade.

36. The method according to claim 35, further comprising: attaching one or more objects to a track portion of said device before lifting said device in relation to the wind turbine.

37. The method according to claim 35, further comprising: supporting the device in relation to the tower of the wind turbine while being lifted.

38. The method according to claim 35, wherein said step of engaging the rotor blade at both the first edge and the second edge of the rotor blade of the rotor blade is performed at a level at or near "chord max"-level-or at a level where a minimum distance between a front edge of the rotor blade and the tower exists.

39. The method claim 35, further comprising: first arranging a rotor blade in essentially a vertical orientation and with a rear edge of the rotor blade near the tower.

40. A device for enabling access to a rotor blade of a wind turbine by lowering and/or lifting the device in relation to the wind turbine, the device comprising:
a frame structure;
a rotor blade support for supporting the device in relation to said rotor blade;
a hoist for lowering or lifting the device in relation to the wind turbine;
a movable object that is movable in relation to the frame structure and carried by said frame structure; and
a tower support for supporting the device in relation to a wind turbine tower;
wherein at least part of the frame structure comprises a track portion, the track portion being adapted to guide said, in relation to the track portion, movable object along the track portion;
wherein said rotor blade support is adapted for supporting the device in relation to a front edge and a rear edge of said rotor blade and is configured for positioning said device in relation to the rotor blade;
wherein said rotor blade support is further configured for facilitating a movement of said device substantially in the longitudinal direction of said rotor blade and configured for adapting to the actual size or shape of the rotor blade during the movement of the device along the rotor blade;
wherein said frame structure has an open configuration; and
wherein said tower support is configured for supporting against said wind turbine tower at least at two points in the vertical direction, and wherein at least one of said at least said two points is adjustable in relation to the surface of the wind turbine tower.

41. A device for enabling access to a rotor blade of a wind turbine by lowering and/or lifting the device in relation to the wind turbine, the device comprising:
a frame structure;
a rotor blade support for supporting the device in relation to said rotor blade;
a hoist for lowering or lifting the device in relation to the wind turbine; and
a movable object that is movable in relation to the frame structure and carried by said frame structure;
wherein at least part of the frame structure comprises a track portion, the track portion being adapted to guide said, in relation to the track portion, movable object along the track portion;
wherein said rotor blade support is adapted for supporting the device in relation to a front edge and a rear edge of said rotor blade and is configured for positioning said device in relation to the rotor blade;
wherein said rotor blade support is further configured for facilitating a movement of said device substantially in the longitudinal direction of said rotor blade and configured for adapting to the actual size or shape of the rotor blade during the movement of the device along the rotor blade;
wherein said frame structure has an open configuration; and
wherein the object comprises two or more work platforms, gondolas, tools, robots, or apparatuses, and one of said two or more work platforms, gondolas, tools, robots, or apparatuses is configured as a master unit and the other(s) is/are configured as slave unit(s).

42. A device for enabling access to a rotor blade of a wind turbine by lowering and/or lifting the device in relation to the wind turbine, the device comprising:
- a frame structure;
- a rotor blade support for supporting the device in relation to said rotor blade;
- a hoist for lowering or lifting the device in relation to the wind turbine; and
- a movable object that is movable in relation to the frame structure and carried by said frame structure;
- wherein at least part of the frame structure comprises a track portion, the track portion being adapted to guide said, in relation to the track portion, movable object along the track portion;
- wherein said rotor blade support is adapted for supporting the device in relation to a front edge and a rear edge of said rotor blade and is configured for positioning said device in relation to the rotor blade;
- wherein said rotor blade support is further configured for facilitating a movement of said device substantially in the longitudinal direction of said rotor blade and configured for adapting to the actual size or shape of the rotor blade during the movement of the device along the rotor blade;
- wherein said frame structure has an open configuration; and
- wherein the object comprises two or more work platforms, gondolas, tools, robots, or apparatuses, and said two or more work platforms, gondolas, tools, robots, or apparatuses are configured for being connected together to form a single gondola, work platform, tool, robot, or apparatus.

43. A device for enabling access to a rotor blade of a wind turbine by lowering and/or lifting the device in relation to the wind turbine, the device comprising:
- a frame structure;
- a rotor blade support for supporting the device in relation to said rotor blade;
- a hoist for lowering or lifting the device in relation to the wind turbine; and
- a movable object that is movable in relation to the frame structure and carried by said frame structure; and
- an active dampener for performing a dampening action of the device in relation to said wind turbine rotor blade, said active dampener being controlled on the basis of input signals from a sensor comprising wind sensors and accelerometers;
- wherein at least part of the frame structure comprises a track portion, the track portion being adapted to guide said, in relation to the track portion, movable object along the track portion;
- wherein said rotor blade support is adapted for supporting the device in relation to a front edge and a rear edge of said rotor blade and is configured for positioning said device in relation to the rotor blade;
- wherein said rotor blade support is further configured for facilitating a movement of said device substantially in the longitudinal direction of said rotor blade and configured for adapting to the actual size or shape of the rotor blade during the movement of the device along the rotor blade; and
- wherein said frame structure has an open configuration.

* * * * *